United States Patent
Chaugule et al.

(10) Patent No.: US 12,490,106 B2
(45) Date of Patent: Dec. 2, 2025

(54) NETWORK INTERFACE MANAGEMENT FOR CITIZENS BROADBAND RADIO SERVICE

(71) Applicant: Apple Inc., Cupertino, CA (US)

(72) Inventors: Raj S Chaugule, Santa Clara, CA (US); Li Li, Saratoga, CA (US); En Yang Zhang, Calgary (CA); Piyush Kumar Garg, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 657 days.

(21) Appl. No.: 17/832,255

(22) Filed: Jun. 3, 2022

(65) Prior Publication Data

US 2022/0394492 A1   Dec. 8, 2022

Related U.S. Application Data

(60) Provisional application No. 63/197,221, filed on Jun. 4, 2021.

(51) Int. Cl.
*H04W 16/14*   (2009.01)
*H04W 4/021*   (2018.01)
*H04W 84/12*   (2009.01)

(52) U.S. Cl.
CPC .......... *H04W 16/14* (2013.01); *H04W 4/021* (2013.01); *H04W 84/12* (2013.01)

(58) Field of Classification Search
CPC ...... H04W 16/14; H04W 4/021; H04W 84/12
See application file for complete search history.

(56) References Cited

U.S. PATENT DOCUMENTS

| 2020/0008138 A1* | 1/2020 | Sasindran | H04W 76/10 |
| 2021/0051763 A1* | 2/2021 | Gundavelli | H04W 8/20 |

* cited by examiner

*Primary Examiner* — Kevin C. Harper
*Assistant Examiner* — Salma Ayad
(74) *Attorney, Agent, or Firm* — Kowert, Hood, Munyon, Rankin & Goetzel, P.C.

(57) ABSTRACT

Apparatuses, systems, and methods for network interface management for Citizens Broadband Radio Service (CBRS) deployments, e.g., in LTE and/or 5G NR systems and beyond, including methods for coarse selection of CBRS networks and fine selection of CBRS networks as well as support for multiple CBRS networks. Coarse selection of CBRS networks may include various triggers for automatic CBRS profile enabling and/or disabling, user management and overriding of system selections, tiered hierarchy for CBRS network enabling and/or disabling, as well as mechanisms to avoid ping-ponging between network selection. Fine selection of CBRS networks may include data slot switching between mobile network operators (MNOs, e.g., LTE/NR macro cells) and CBRS eSIM as well as prioritization of CBRS networks over Wi-Fi networks. Multiple CBRS networks support may include CBRS network identifier (NID) matching for unique identification as well as user-ranked CBRS priority.

20 Claims, 22 Drawing Sheets

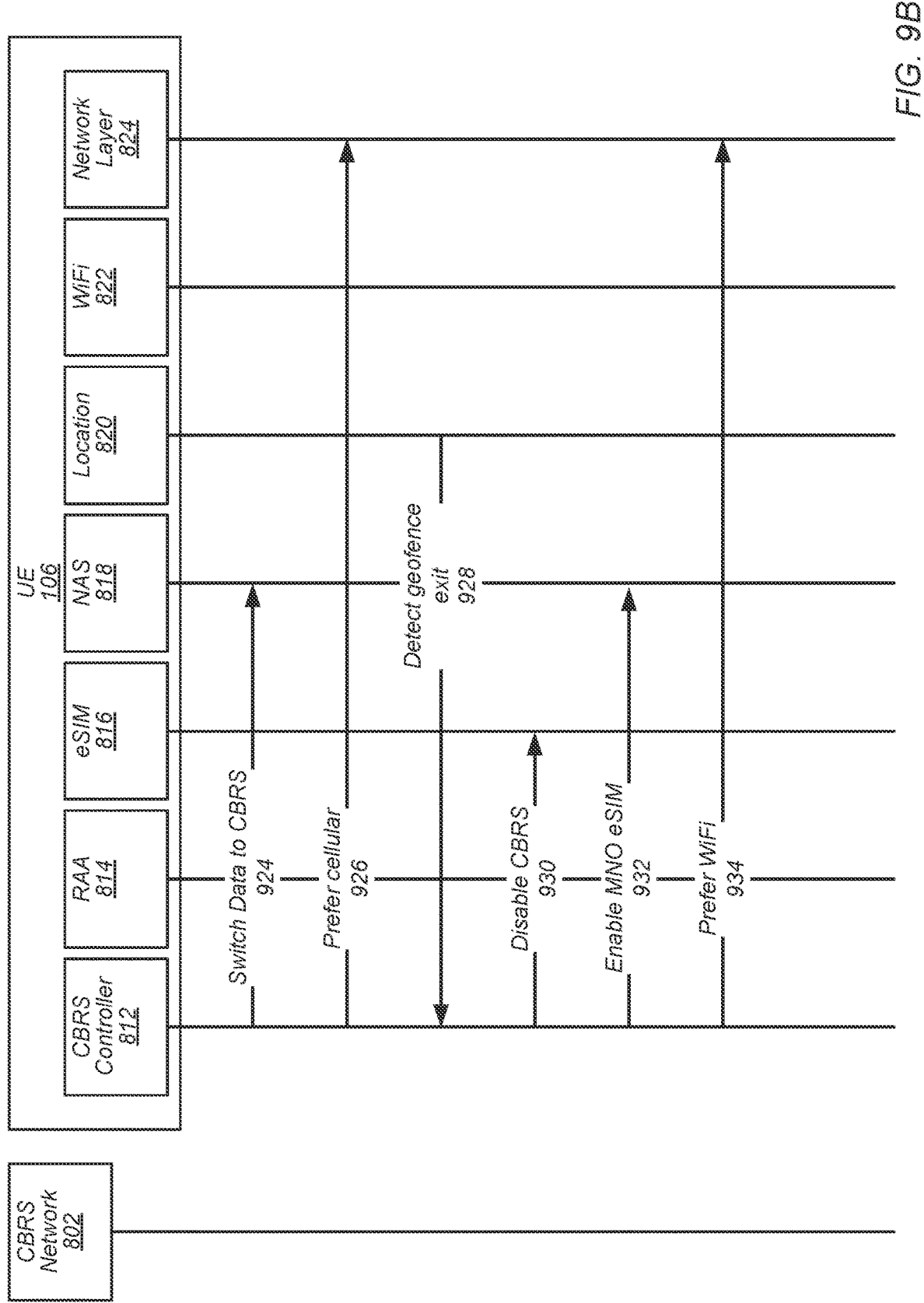

NETWORK INTERFACE MANAGEMENT FOR CITIZENS BROADBAND RADIO SERVICE

PRIORITY INFORMATION

This application claims benefit of priority to U.S. Provisional Application Ser. No. 63/197,221, titled "Network Interface Management for Citizens Broadband Radio Service", filed Jun. 4, 2021, which is hereby incorporated by reference in its entirety as though fully and completely set forth herein.

FIELD

The invention relates to wireless communications, and more particularly to apparatuses, systems, and methods for network interface management for Citizens Broadband Radio Service (CBRS) deployments, e.g., in LTE and/or 5G NR systems and beyond.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Long Term Evolution (LTE) is currently the technology of choice for the majority of wireless network operators worldwide, providing mobile broadband data and high-speed Internet access to their subscriber base. LTE was first proposed in 2004 and was first standardized in 2008. Since then, as usage of wireless communication systems has expanded exponentially, demand has risen for wireless network operators to support a higher capacity for a higher density of mobile broadband users. Thus, in 2015 study of a new radio access technology began and, in 2017, a first release of Fifth Generation New Radio (5G NR) was standardized.

5G-NR, also simply referred to as NR, provides, as compared to LTE, a higher capacity for a higher density of mobile broadband users, while also supporting device-to-device, ultra-reliable, and massive machine type communications with lower latency and/or lower battery consumption. Further, NR may allow for more flexible UE scheduling as compared to current LTE. Consequently, efforts are being made in ongoing developments of 5G-NR to take advantage of higher throughputs possible at higher frequencies.

Additionally, rapid spread and use of wireless communications has led to an ever-increasing deployment of distributed antenna systems (DAS). Driven in part by rising bandwidth requirements and quality of service expectations, the deployment and maintenance of today's advanced DAS has experienced a steady cost increase. For many years, auctioned licensed spectrum allocations statewide and nationwide were exclusively acquired by Tier-1 cellular carriers as it proved too expensive for Tier-2/Tier-3 carriers and other potential local operators. Tier-1 carriers were thereby able to use the allocated spectrum as a strategic asset for 3GPP technologies (e.g., LTE and/or NR), which has proven to be a barrier to innovation in wireless services as well as slowing down service improvements. For example, deployment has been focused on Tier-1 venues, leaving Tier-2/Tier-3 venues and indoor venues with poor coverage. Tier-2/Tier-3 network operators, enterprises, small communities and venue owners cannot acquire spectrum that would allow them to improve the wireless coverage in Tier-2/Tier-3 venues and indoor private buildings, which slows the densification and installation of small cells.

For at least the above reasons, the wireless industry as a whole has been pursuing a variety of service delivery models designed to offset these high costs while ensuring reliable and profitable in-building coverage and capacity. One particular DAS that has received much attention is the neutral host DAS, or neutral host for short. A neutral host shifts the ownership of the system from a carrier to either a building owner, DAS integrator or a third-party system provider. Present day DAS system deployments, e.g., in enterprise buildings, have proven to be extremely expensive due to the required installation of Tier-1 carrier equipment for operating in the carrier's licensed spectrum. Under the neutral host model, the independent third-party host assumes all financial, regulatory, legal and technical responsibility for deploying, installing and maintaining the system. The host may lease space or access to the system to one or more operators. The neutral host model provides a number of attractive benefits, chief among them the increased number of providers who are able and willing to help satisfy the growing demand in the market. To facilitate the installation, reduce the cost, and simplify the process and spread of effective neutral hosts, a new Citizens Broadband Radio Service (CBRS) for shared wireless broadband use of the 3550-3700 MHz band (3.5 GHz Band) was established. CBRS provides potential benefits of indoor and outdoor cellular services, e.g., LTE/NR services within a shared 3.5 GHz spectrum by opening up those bands for commercial use such as carrier-based cellular service extensions and private LTE/NR networks within enterprises, sports stadiums and conference centers, among others. Such services promise to complement, and in some cases possibly replace Wi-Fi, in addition to paving the way for 5G/NR wireless services. In other words, CBRS band(s) can be used by cellular networks to provide private LTE/NR and neutral host networks (e.g., Wi-Fi Type deployments in buildings and enterprises) using LTE or NR small cells and networks.

The welcome addition of these new wireless services also raises new issues. Devices are expected to recognize and efficiently connect with and operate on these new wireless networks. In addition, improved device mobility is required to allow devices to seamlessly move from operating on one wireless service to operating on another wireless service.

SUMMARY

Embodiments relate to wireless communications, and more particularly to apparatuses, systems, and methods for network interface management for Citizens Broadband Radio Service (CBRS) deployments, e.g., in LTE and/or 5G NR systems and beyond.

For example, embodiments include methods for coarse selection of CBRS networks and fine selection of CBRS networks as well as support for multiple CBRS networks. Coarse selection of CBRS networks may include various triggers for automatic CBRS profile enabling and/or disabling, user management and overriding of system selections, tiered hierarchy for CBRS network enabling and/or disabling, as well as mechanisms to avoid ping-ponging between network selection. Fine selection of CBRS networks may include data slot switching between mobile network operators (MNOs, e.g., LTE/NR macro cells) and CBRS eSIM as well as prioritization of CBRS networks over Wi-Fi networks. Multiple CBRS networks support may include CBRS network identifier (NID) matching for unique identification as well as user-ranked CBRS priority.

The techniques described herein may be implemented in and/or used with a number of different types of devices, including but not limited to unmanned aerial vehicles (UAVs), unmanned aerial controllers (UACs), a UTM server, base stations, access points, cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIGS. 9A and 9B illustrate an example of signaling for selection of a CBRS network based on one or more provisioned CBRS profiles, according to some embodiments.

Figure 1A:
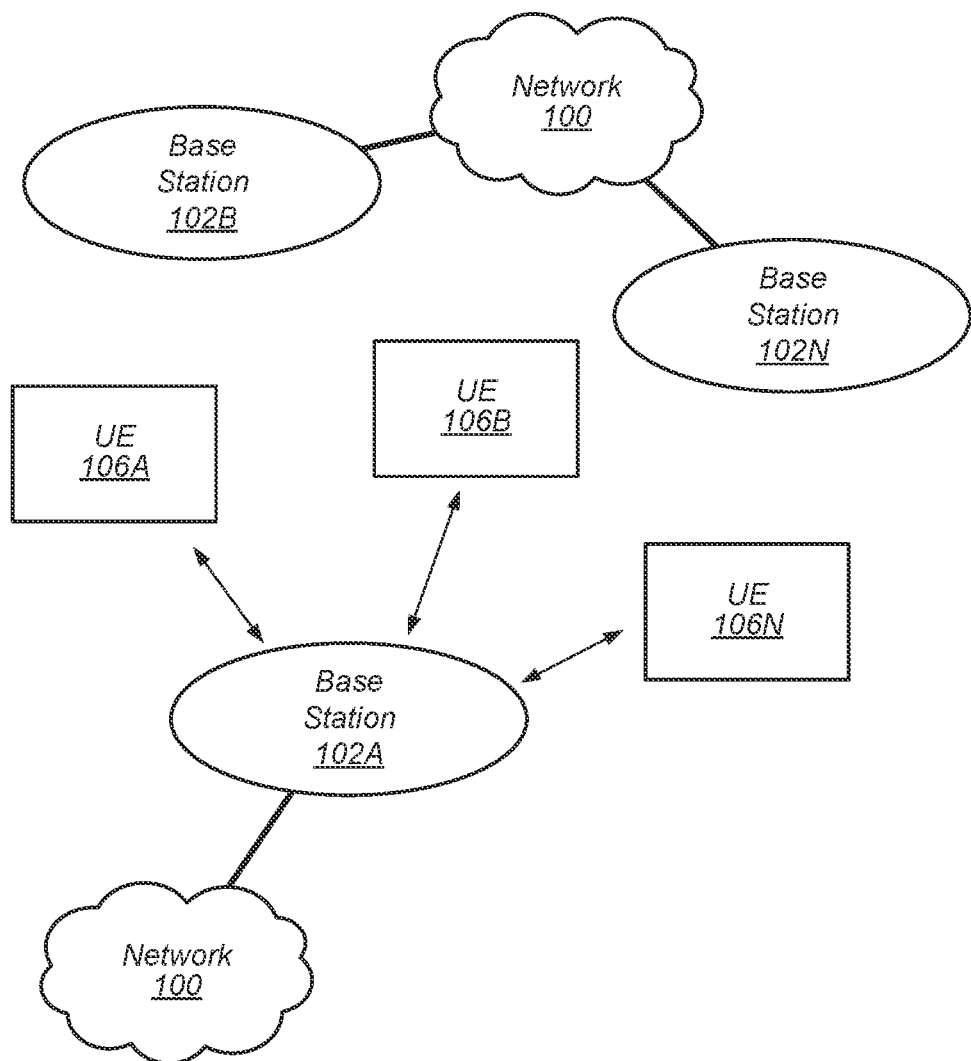
FIG. 1A illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

3GPP: Third Generation Partnership Project
UE: User Equipment
RF: Radio Frequency
BS: Base Station
DL: Downlink
UL: Uplink
LTE: Long Term Evolution
NR: New Radio
CBRS: Citizens Broadband Radio Service
DAS: Distributed Antenna System
5GS: 5G System
5GMM: 5GS Mobility Management
5GC/5GCN: 5G Core Network
SIM: Subscriber Identity Module
eSIM: Embedded Subscriber Identity Module
IE: Information Element
CE: Control Element
MAC: Medium Access Control
SSB: Synchronization Signal Block
CSI-RS: Channel State Information Reference Signal PDCCH: Physical Downlink Control Channel
PDSCH: Physical Downlink Shared Channel
RRC: Radio Resource Control
RRM: Radio Resource Management
CORESET: Control Resource Set
TCI: Transmission Configuration Indicator
DCI: Downlink Control Indicator Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")— any of various types of computer systems devices which are mobile or portable and which performs wireless communications. Examples of UE devices include mobile telephones or smart phones (e.g., iPhone™, Android™-based phones), portable gaming devices (e.g., Nintendo DS™ Play Station Portable™, Gameboy Advance™, iPhone™), laptops, wearable devices (e.g., smart watch, smart glasses), PDAs, portable Internet devices, music players, data storage devices, other handheld devices, unmanned aerial vehicles (UAVs) (e.g., drones), UAV controllers (UACs), and so forth. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Wi-Fi—The term "Wi-Fi" (or WiFi) has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

3GPP Access—refers to accesses (e.g., radio access technologies) that are specified by 3GPP standards. These accesses include, but are not limited to, GSM/GPRS, LTE, LTE-A, and/or 5G NR. In general, 3GPP access refers to various types of cellular access technologies.

Non-3GPP Access—refers any accesses (e.g., radio access technologies) that are not specified by 3GPP standards. These accesses include, but are not limited to, WiMAX, CDMA2000, Wi-Fi, WLAN, and/or fixed networks. Non-3GPP accesses may be split into two categories, "trusted" and "untrusted": Trusted non-3GPP accesses can interact directly with an evolved packet core (EPC) and/or a 5G core (5GC) whereas untrusted non-3GPP accesses interwork with the EPC/5GC via a network entity, such as an Evolved Packet Data Gateway and/or a 5G NR gateway. In general, non-3GPP access refers to various types on non-cellular access technologies.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 1B:
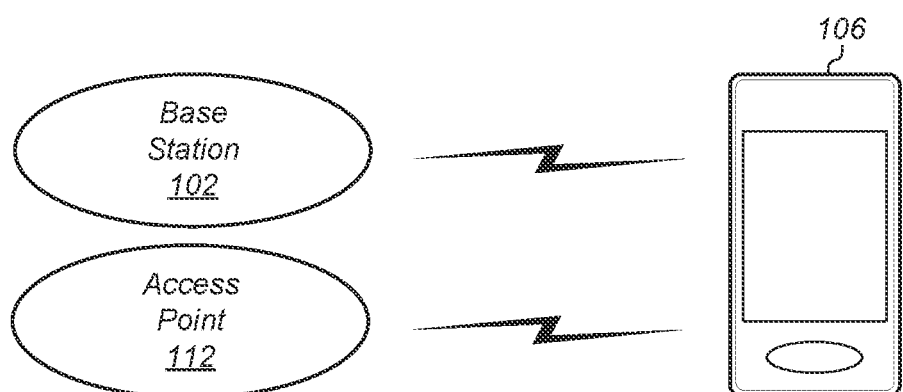
FIG. 1B illustrates an example of a base station and an access point in communication with a user equipment (UE) device, according to some embodiments.

FIGS. 1A and 1B: Communication Systems

FIG. 1A illustrates a simplified example wireless communication system, according to some embodiments. It is noted that the system of FIG. 1A is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 1B illustrates user equipment 106 (e.g., one of the devices 106A through 106N) in communication with a base station 102 and an access point 112, according to some embodiments. The UE 106 may be a device with both cellular communication capability and non-cellular communication capability (e.g., Bluetooth, Wi-Fi, and so forth) such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD), LTE/LTE-Advanced, or 5G NR using a single shared radio and/or GSM, LTE, LTE-Advanced, or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 2:
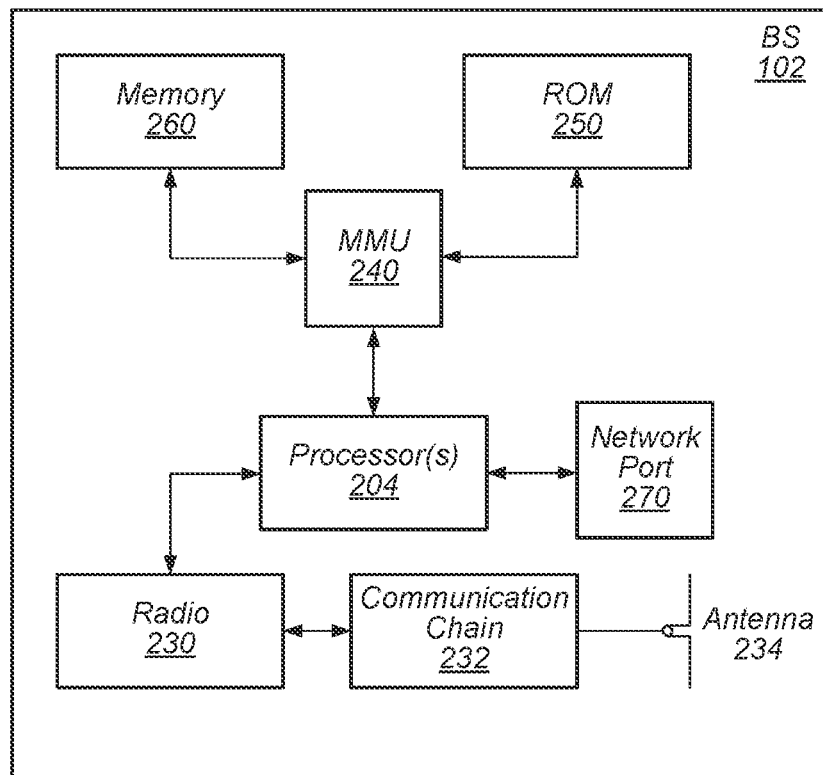
FIG. 2 illustrates an example block diagram of a base station, according to some embodiments.

FIG. 2: Block Diagram of a Base Station

Figure 3:
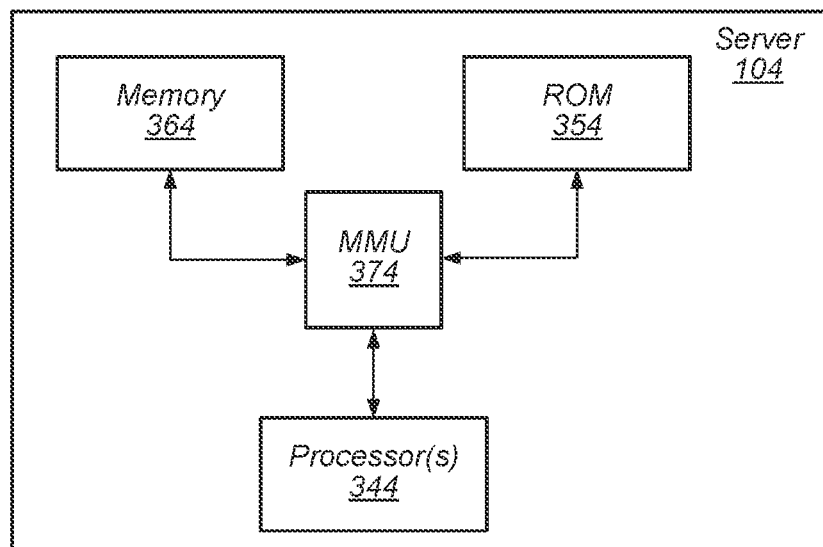
FIG. 3 illustrates an example block diagram of a server according to some embodiments.

FIG. 2 illustrates an example block diagram of a base station 102, according to some embodiments. It is noted that the base station of FIG. 3 is merely one example of a possible base station. As shown, the base station 102 may include processor(s) 204 which may execute program instructions for the base station 102. The processor(s) 204 may also be coupled to memory management unit (MMU) 240, which may be configured to receive addresses from the processor(s) 204 and translate those addresses to locations in memory (e.g., memory 260 and read only memory (ROM) 250) or to other circuits or devices.

The base station 102 may include at least one network port 270. The network port 270 may be configured to couple to a telephone network and provide a plurality of devices, such as UE devices 106, access to the telephone network as described above in FIGS. 1 and 2.

The network port 270 (or an additional network port) may also or alternatively be configured to couple to a cellular network, e.g., a core network of a cellular service provider. The core network may provide mobility related services and/or other services to a plurality of devices, such as UE devices 106. In some cases, the network port 270 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 234, and possibly multiple antennas. The at least one antenna 234 may be configured to operate as a wireless transceiver and may be further configured to communicate with UE devices 106 via radio 230. The antenna 234 communicates with the radio 230 via communication chain 232. Communication chain 232 may be a receive chain, a transmit chain or both. The radio 230 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 204 of the base station 102 may be configured to implement or support implementation of part or all of the methods described herein, e.g., by executing program instructions stored on a memory medium (e.g., a non-transitory computer-readable memory medium). Alternatively, the processor 204 may be configured as a programmable hardware element, such as an FPGA (Field Programmable Gate Array), or as an ASIC (Application Specific Integrated Circuit), or a combination thereof. Alternatively (or in addition) the processor 204 of the BS 102, in conjunction with one or more of the other components 230, 232, 234, 240, 250, 260, 270 may be configured to implement or support implementation of part or all of the features described herein.

In addition, as described herein, processor(s) 204 may be comprised of one or more processing elements. In other words, one or more processing elements may be included in processor(s) 204. Thus, processor(s) 204 may include one or more integrated circuits (ICs) that are configured to perform the functions of processor(s) 204. In addition, each integrated circuit may include circuitry (e.g., first circuitry, second circuitry, etc.) configured to perform the functions of processor(s) 204.

Further, as described herein, radio 230 may be comprised of one or more processing elements. In other words, one or more processing elements may be included in radio 230. Thus, radio 230 may include one or more integrated circuits (ICs) that are configured to perform the functions of radio 230. In addition, each integrated circuit may include circuitry (e.g., first circuitry, second circuitry, etc.) configured to perform the functions of radio 230.

FIG. 3: Block Diagram of a Server

FIG. 3 illustrates an example block diagram of a server 104, according to some embodiments. It is noted that the server of FIG. 3 is merely one example of a possible server. As shown, the server 104 may include processor(s) 344 which may execute program instructions for the server 104. The processor(s) 344 may also be coupled to memory management unit (MMU) 374, which may be configured to receive addresses from the processor(s) 344 and translate those addresses to locations in memory (e.g., memory 364 and read only memory (ROM) 354) or to other circuits or devices.

The server 104 may be configured to provide a plurality of devices, such as base station 102, UE devices 106, and/or UTM 108, access to network functions, e.g., as further described herein.

In some embodiments, the server 104 may be part of a radio access network, such as a 5G New Radio (5G NR) radio access network. In some embodiments, the server 104 may be connected to a legacy evolved packet core (EPC) network and/or to a NR core (NRC) network.

As described further subsequently herein, the server 104 may include hardware and software components for implementing or supporting implementation of features described herein. The processor 344 of the server 104 may be configured to implement or support implementation of part or all of the methods described herein, e.g., by executing program instructions stored on a memory medium (e.g., a non-transitory computer-readable memory medium). Alternatively, the processor 344 may be configured as a programmable hardware element, such as an FPGA (Field Programmable Gate Array), or as an ASIC (Application Specific Integrated Circuit), or a combination thereof. Alternatively (or in addition) the processor 344 of the server 104, in conjunction with one or more of the other components 354, 364, and/or 374 may be configured to implement or support implementation of part or all of the features described herein.

In addition, as described herein, processor(s) 344 may be comprised of one or more processing elements. In other words, one or more processing elements may be included in processor(s) 344. Thus, processor(s) 344 may include one or more integrated circuits (ICs) that are configured to perform the functions of processor(s) 344. In addition, each integrated circuit may include circuitry (e.g., first circuitry, second circuitry, etc.) configured to perform the functions of processor(s) 344.

Figure 4:
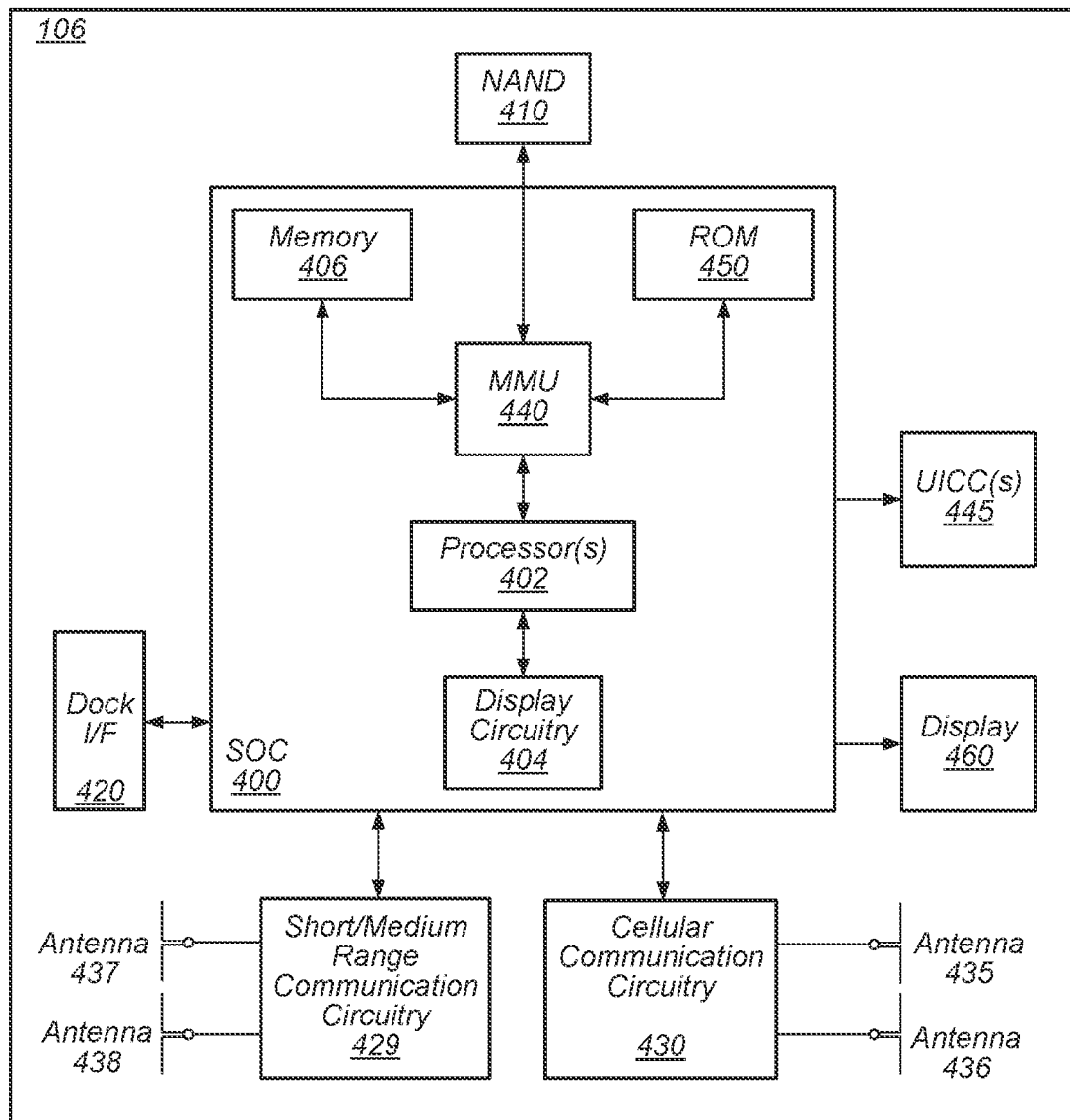
FIG. 4 illustrates an example block diagram of a UE according to some embodiments.

FIG. 4: Block Diagram of a UE

FIG. 4 illustrates an example simplified block diagram of a communication device 106, according to some embodiments. It is noted that the block diagram of the communication device of FIG. 4 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, an unmanned aerial vehicle (UAV), a UAV controller (UAC) and/or a combination of devices, among other devices. As shown, the communication device 106 may include a set of components 400 configured to perform core functions. For example, this set of components may be implemented as a system on chip (SOC), which may include portions for various purposes. Alternatively, this set of components 400 may be implemented as separate components or groups of components for the various purposes. The set of components 400 may be coupled (e.g., communicatively; directly or indirectly) to various other circuits of the communication device 106.

For example, the communication device 106 may include various types of memory (e.g., including NAND flash 410), an input/output interface such as connector I/F 420 (e.g., for connecting to a computer system; dock; charging station; input devices, such as a microphone, camera, keyboard; output devices, such as speakers; etc.), the display 460, which may be integrated with or external to the communication device 106, and cellular communication circuitry 430 such as for 5G NR, LTE, GSM, etc., and short to medium range wireless communication circuitry 429 (e.g., Bluetooth™ and WLAN circuitry). In some embodiments, communication device 106 may include wired communication circuitry (not shown), such as a network interface card, e.g., for Ethernet.

The cellular communication circuitry 430 may couple (e.g., communicatively; directly or indirectly) to one or more antennas, such as antennas 435 and 436 as shown. The short to medium range wireless communication circuitry 429 may also couple (e.g., communicatively; directly or indirectly) to one or more antennas, such as antennas 437 and 438 as shown. Alternatively, the short to medium range wireless communication circuitry 429 may couple (e.g., communicatively; directly or indirectly) to the antennas 435 and 436 in addition to, or instead of, coupling (e.g., communicatively; directly or indirectly) to the antennas 437 and 438. The short to medium range wireless communication circuitry 429 and/or cellular communication circuitry 430 may include multiple receive chains and/or multiple transmit chains for receiving and/or transmitting multiple spatial streams, such as in a multiple-input multiple output (MIMO) configuration.

In some embodiments, as further described below, cellular communication circuitry 430 may include dedicated receive chains (including and/or coupled to, e.g., communicatively; directly or indirectly, dedicated processors and/or radios) for multiple RATs (e.g., a first receive chain for LTE and a second receive chain for 5G NR). In addition, in some embodiments, cellular communication circuitry 430 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 460 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 445 that include SIM (Subscriber Identity Module) functionality, such as one or more UICC(s) (Universal Integrated Circuit Card(s)) cards 445. Note that the term "SIM" or "SIM entity" is intended to include any of various types of SIM implementations or SIM functionality, such as the one or more UICC(s) cards 445, one or more eUICCs, one or more eSIMs, either removable or embedded, etc. In some embodiments, the UE 106 may include at least two SIMs. Each SIM may execute one or more SIM applications and/or otherwise implement SIM functionality. Thus, each SIM may be a single smart card that may be embedded, e.g., may be soldered onto a circuit board in the UE 106, or each SIM 410 may be implemented as a removable smart card. Thus, the SIM(s) may be one or more removable smart cards (such as UICC cards, which are sometimes referred to as "SIM cards"), and/or the SIMs 410 may be one or more embedded cards (such as embedded UICCs (eUICCs), which are sometimes referred to as "eSIMs" or "eSIM cards"). In some embodiments (such as when the SIM(s) include an eUICC), one or more of the SIM(s) may implement embedded SIM (eSIM) functionality; in such an embodiment, a single one of the SIM(s) may execute multiple SIM applications. Each of the SIMS may include components such as a processor and/or a memory; instructions for performing SIM/eSIM functionality may be stored in the memory and executed by the processor. In some embodiments, the UE 106 may include a combination of removable smart cards and fixed/non-removable smart cards (such as one or more eUICC cards that implement eSIM functionality), as desired. For example, the UE 106 may comprise two embedded SIMs, two removable SIMS, or a combination of one embedded SIMs and one removable SIMs. Various other SIM configurations are also contemplated.

As noted above, in some embodiments, the UE 106 may include two or more SIMs. The inclusion of two or more SIMs in the UE 106 may allow the UE 106 to support two different telephone numbers and may allow the UE 106 to communicate on corresponding two or more respective networks. For example, a first SIM may support a first RAT such as LTE, and a second SIM 410 support a second RAT such as 5G NR. Other implementations and RATs are of course possible. In some embodiments, when the UE 106 comprises two SIMs, the UE 106 may support Dual SIM Dual Active (DSDA) functionality. The DSDA functionality may allow the UE 106 to be simultaneously connected to two networks (and use two different RATs) at the same time, or to simultaneously maintain two connections supported by two different SIMs using the same or different RATs on the same or different networks. The DSDA functionality may also allow the UE 106 to simultaneously receive voice calls or data traffic on either phone number. In certain embodiments the voice call may be a packet switched communication. In other words, the voice call may be received using voice over LTE (VoLTE) technology and/or voice over NR (VoNR) technology. In some embodiments, the UE 106 may support Dual SIM Dual Standby (DSDS) functionality. The DSDS functionality may allow either of the two SIMs in the UE 106 to be on standby waiting for a voice call and/or data connection. In DSDS, when a call/data is established on one SIM, the other SIM is no longer active. In some embodiments, DSDx functionality (either DSDA or DSDS functionality) may be implemented with a single SIM (e.g., a eUICC) that executes multiple SIM applications for different carriers and/or RATs.

As shown, the SOC 400 may include processor(s) 402, which may execute program instructions for the communication device 106 and display circuitry 404, which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, short to medium range wireless communication circuitry 429, cellular communication circuitry 430, connector I/F 420, and/or display 460. The MMU 440 may be configured to perform memory protection and page table translation or set up. In some embodiments, the MMU 440 may be included as a portion of the processor(s) 402.

As noted above, the communication device 106 may be configured to communicate using wireless and/or wired communication circuitry. The communication device 106 may be configured to perform methods for revocation and/or modification of user consent in MEC, e.g., in LTE and/or 5G NR systems and beyond, as further described herein.

As described herein, the communication device 106 may include hardware and software components for implementing the above features for a communication device 106 to communicate a scheduling profile for power savings to a network. The processor 402 of the communication device 106 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the communication device 106, in conjunction with one or more of the other components 400, 404, 406, 410, 420, 429, 430, 440, 445, 450, 460 may be configured to implement part or all of the features described herein.

In addition, as described herein, processor 402 may include one or more processing elements. Thus, processor 402 may include one or more integrated circuits (ICs) that are configured to perform the functions of processor 402. In addition, each integrated circuit may include circuitry (e.g., first circuitry, second circuitry, etc.) configured to perform the functions of processor(s) 402.

Further, as described herein, cellular communication circuitry 430 and short to medium range wireless communication circuitry 429 may each include one or more processing elements. In other words, one or more processing elements may be included in cellular communication circuitry 430 and, similarly, one or more processing elements may be included in short to medium range wireless communication circuitry 429. Thus, cellular communication circuitry 430 may include one or more integrated circuits (ICs) that are configured to perform the functions of cellular communication circuitry 430. In addition, each integrated circuit may include circuitry (e.g., first circuitry, second circuitry, etc.) configured to perform the functions of cellular communication circuitry 430. Similarly, the short to medium range wireless communication circuitry 429 may include one or more ICs that are configured to perform the functions of short to medium range wireless communication circuitry 429. In addition, each integrated circuit may include circuitry (e.g., first circuitry, second circuitry, etc.) configured to perform the functions of short to medium range wireless communication circuitry 429.

Figure 5:
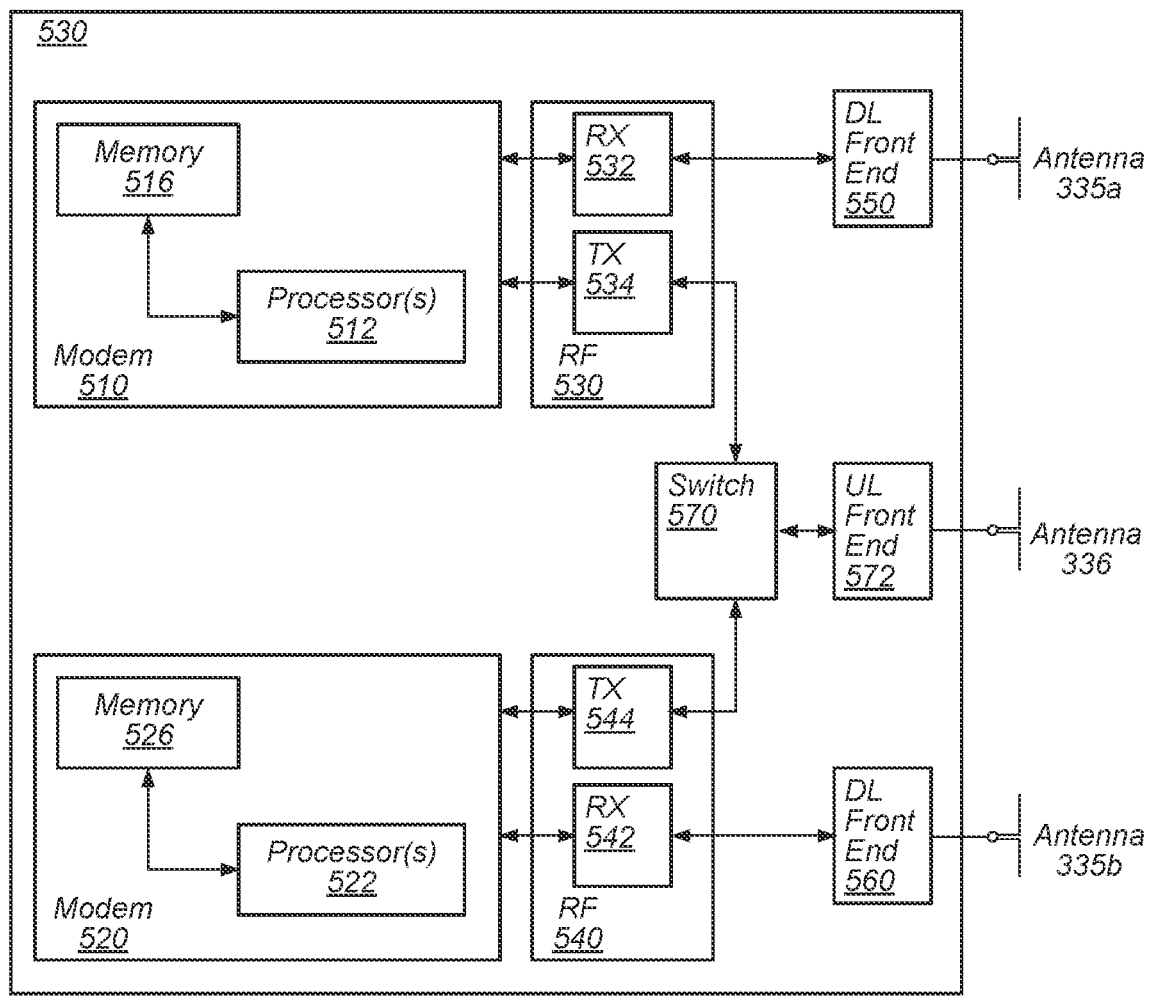
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry (radio frequency (RF) front end) 530, which may be cellular communication circuitry 430, may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 530 may couple (e.g., communicatively; directly or indirectly) to one or more antennas, such as antennas 435a-b and 436 as shown (in FIG. 4). In some embodiments, cellular communication circuitry 530 may include dedicated receive chains (including and/or coupled to, e.g., communicatively; directly or indirectly, dedicated processors and/or radios) for multiple RATs (e.g., a first receive chain for LTE and a second receive chain for 5G NR). For example, as shown in FIG. 5, cellular communication circuitry 530 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 530 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 530 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 530 may be configured to perform methods for network interface management for Citizens Broadband Radio Service (CBRS) deployments, e.g., in LTE and/or 5G NR systems and beyond, as further described herein.

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for communicating a scheduling profile for power savings to a network, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

Figure 6A:
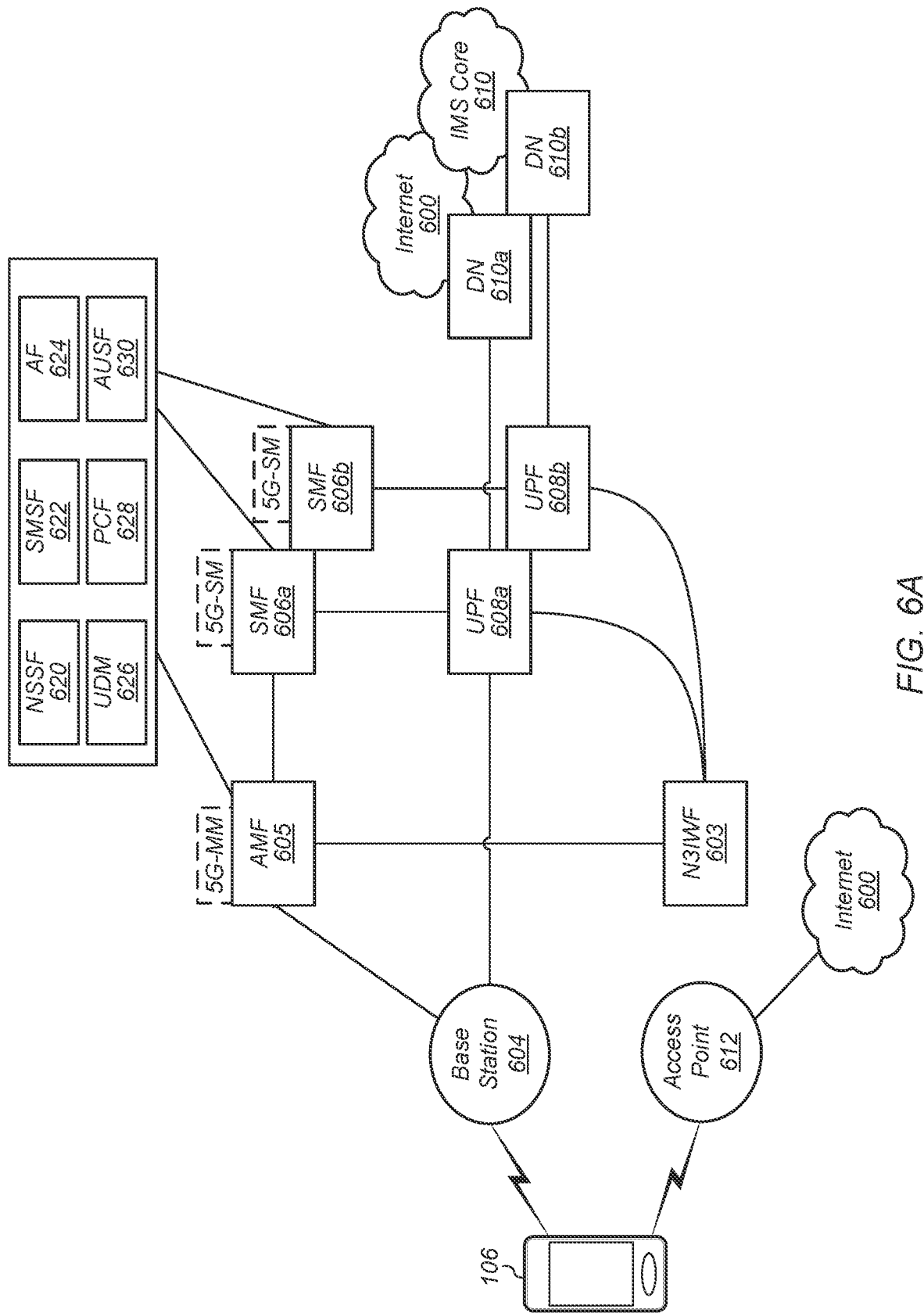
FIG. 6A illustrates an example of a 5G network architecture that incorporates both 3GPP (e.g., cellular) and non-3GPP (e.g., non-cellular) access to the 5G CN, according to some embodiments.
Figure 6B:
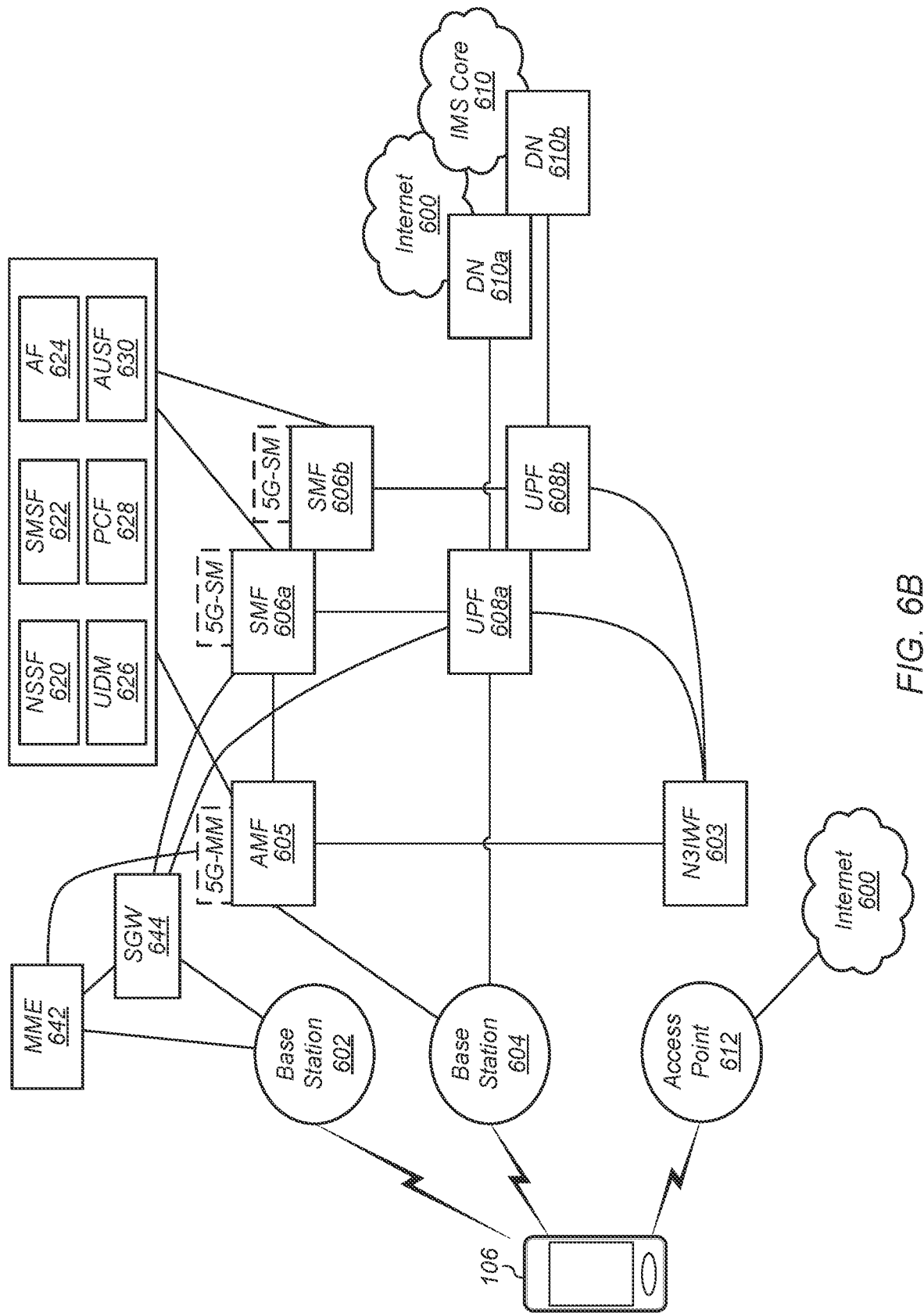
FIG. 6B illustrates an example of a 5G network architecture that incorporates both dual 3GPP (e.g., LTE and 5G NR) access and non-3GPP access to the 5G CN, according to some embodiments.
Figure 7:
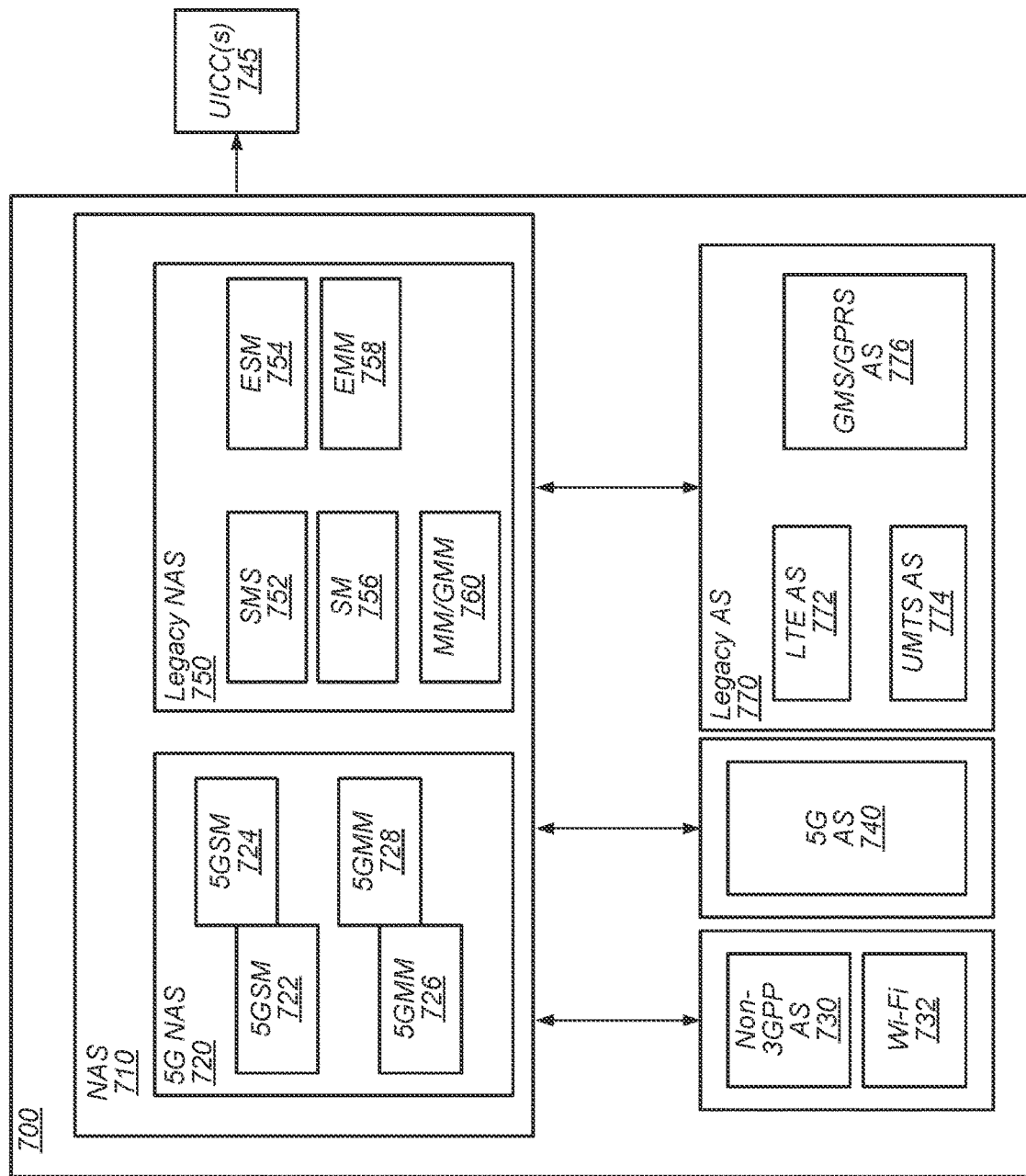
FIG. 7 illustrates an example of a baseband processor architecture for a UE, according to some embodiments.

FIGS. 6A, 6B and 7: 5G Core Network Architecture—Interworking with Wi-Fi

In some embodiments, the 5G core network (CN) may be accessed via (or through) a cellular connection/interface (e.g., via a 3GPP communication architecture/protocol) and a non-cellular connection/interface (e.g., a non-3GPP access architecture/protocol such as Wi-Fi connection). FIG. 6A illustrates an example of a 5G network architecture that incorporates both 3GPP (e.g., cellular) and non-3GPP (e.g., non-cellular) access to the 5G CN, according to some embodiments. As shown, a user equipment device (e.g., such as UE 106) may access the 5G CN through both a radio access network (RAN, e.g., such as gNB 604, which may be a base station 102) and an access point, such as AP 612. The AP 612 may include a connection to the Internet 600 as well as a connection to a non-3GPP interworking function (N3IWF) 603 network entity. The N3IWF may include a connection to a core access and mobility management function (AMF) 605 of the 5G CN. The AMF 605 may include an instance of a 5G mobility management (5G MM) function associated with the UE 106. In addition, the RAN (e.g., gNB 604) may also have a connection to the AMF 605. Thus, the 5G CN may support unified authentication over both connections as well as allow simultaneous registration for UE 106 access via both gNB 604 and AP 612. As shown, the AMF 605 may include one or more functional entities associated with the 5G CN (e.g., network slice selection function (NSSF) 620, short message service function (SMSF) 622, application function (AF) 624, unified data management (UDM) 626, policy control function (PCF) 628, and/or authentication server function (AUSF) 630). Note that these functional entities may also be supported by a session management function (SMF) 606a and an SMF 606b of the 5G CN. The AMF 605 may be connected to (or in communication with) the SMF 606a. Further, the gNB 604 may in communication with (or connected to) a user plane function (UPF) 608a that may also be communication with the SMF 606a. Similarly, the N3IWF 603 may be communicating with a UPF 608b that may also be communicating with the SMF 606b. Both UPFs may be communicating with the data network (e.g., DN 610a and 610b) and/or the Internet 600 and Internet Protocol (IP) Multimedia Subsystem/IP Multimedia Core Network Subsystem (IMS) core network 610.

FIG. 6B illustrates an example of a 5G network architecture that incorporates both dual 3GPP (e.g., LTE and 5G NR) access and non-3GPP access to the 5G CN, according to some embodiments. As shown, a user equipment device (e.g., such as UE 106) may access the 5G CN through both a radio access network (RAN, e.g., such as gNB 604 or eNB 602, which may be a base station 102) and an access point, such as AP 612. The AP 612 may include a connection to the Internet 600 as well as a connection to the N3IWF 603 network entity. The N3IWF may include a connection to the AMF 605 of the 5G CN. The AMF 605 may include an instance of the 5G MM function associated with the UE 106. In addition, the RAN (e.g., gNB 604) may also have a connection to the AMF 605. Thus, the 5G CN may support unified authentication over both connections as well as allow simultaneous registration for UE 106 access via both gNB 604 and AP 612. In addition, the 5G CN may support dual-registration of the UE on both a legacy network (e.g., LTE via eNB 602) and a 5G network (e.g., via gNB 604). As shown, the eNB 602 may have connections to a mobility management entity (MME) 642 and a serving gateway (SGW) 644. The MME 642 may have connections to both the SGW 644 and the AMF 605. In addition, the SGW 644 may have connections to both the SMF 606a and the UPF 608a. As shown, the AMF 605 may include one or more functional entities associated with the 5G CN (e.g., NSSF 620, SMSF 622, AF 624, UDM 626, PCF 628, and/or AUSF 630). Note that UDM 626 may also include a home subscriber server (HSS) function and the PCF may also include a policy and charging rules function (PCRF). Note further that these functional entities may also be supported by the SMF 606a and the SMF 606b of the 5G CN. The AMF 606 may be connected to (or in communication with) the SMF 606a. Further, the gNB 604 may in communication with (or connected to) the UPF 608a that may also be communication with the SMF 606a. Similarly, the N3IWF 603 may be communicating with a UPF 608b that may also be communicating with the SMF 606b. Both UPFs may be communicating with the data network (e.g., DN 610a and 610b) and/or the Internet 600 and IMS core network 610.

Note that in various embodiments, one or more of the above-described network entities may be configured to perform methods to improve security checks in a 5G NR network, including mechanisms for network interface management for Citizens Broadband Radio Service (CBRS) deployments, e.g., in LTE and/or 5G NR systems and beyond, e.g., as further described herein.

FIG. 7 illustrates an example of a baseband processor architecture for a UE (e.g., such as UE 106), according to some embodiments. The baseband processor architecture 700 described in FIG. 7 may be implemented on one or more radios (e.g., radios 429 and/or 430 described above) or modems (e.g., modems 510 and/or 520) as described above. As shown, the non-access stratum (NAS) 710 may include a 5G NAS 720 and a legacy NAS 750. The legacy NAS 750 may include a communication connection with a legacy access stratum (AS) 770. The 5G NAS 720 may include communication connections with both a 5G AS 740 and a non-3GPP AS 730 and Wi-Fi AS 732. The 5G NAS 720 may include functional entities associated with both access stratums. Thus, the 5G NAS 720 may include multiple 5G MM entities 726 and 728 and 5G session management (SM) entities 722 and 724. The legacy NAS 750 may include functional entities such as short message service (SMS) entity 752, evolved packet system (EPS) session management (ESM) entity 754, session management (SM) entity 756, EPS mobility management (EMM) entity 758, and mobility management (MM)/GPRS mobility management (GMM) entity 760. In addition, the legacy AS 770 may include functional entities such as LTE AS 772, UMTS AS 774, and/or GSM/GPRS AS 776.

Thus, the baseband processor architecture 700 allows for a common 5G-NAS for both 5G cellular and non-cellular (e.g., non-3GPP access). Note that as shown, the 5G MM may maintain individual connection management and registration management state machines for each connection. Additionally, a device (e.g., UE 106) may register to a single PLMN (e.g., 5G CN) using 5G cellular access as well as non-cellular access. Further, it may be possible for the device to be in a connected state in one access and an idle state in another access and vice versa. Finally, there may be common 5G-MM procedures (e.g., registration, de-registration, identification, authentication, as so forth) for both accesses.

Note that in various embodiments, one or more of the above-described functional entities of the 5G NAS and/or 5G AS may be configured to perform methods for network interface management for Citizens Broadband Radio Service (CBRS) deployments, e.g., in LTE and/or 5G NR systems and beyond, e.g., as further described herein.

Network Interface Management for CBRS

In current implementations, Citizens Broadband Radio Service (CBRS) is defined as a shared spectrum radio access technology (RAT) at 3550-3700 megahertz (MHz) with 3 tiers. A first tier, which receives highest priority in the CBRS shared spectrum, is reserved for military and/or government radio, however, the first tier is rarely in use and/or used. The second tier includes 10 MHz bands licensed to enterprises. The third tier is open access for anyone, however, priority is given to higher tiers as needed/required. Given the free access to the third tier, private CBRS networks have become economically feasible on a commercial level with theoretical performance of CBRS (e.g., such as CBRS LTE) significantly better than Wi-Fi and/or Macro-cell. Additionally, CBRS cells have a limited range which leads to reduced interference as well as allowance for targeted deployments. For example, a warehouse may install a private CBRS for workers to camp on, providing higher bandwidth than previous Wi-Fi networks. As another example, an enterprise may offer employees confidential material only on its CBRS private network to decrease the probability of information leak over the internet. As a further example, a stadium may turn on a CBRS station whenever the stadium is in use (concert, sporting event, and so forth), e.g., to alleviate high demand of data locally during the period of time of an event. However, the availability of these various CBRS private networks requires improved device mobility, e.g., to allow devices to seamlessly move from operating on one wireless service to operating on another wireless service (e.g., from NR/LTE to Wi-Fi to CBRS and the like).

Embodiments described herein provide systems, methods, and mechanisms to support network interface management for Citizens Broadband Radio Service (CBRS) deployments, including systems, methods, and mechanisms for coarse selection of CBRS networks and fine selection of CBRS networks as well as support for multiple CBRS networks. For example, systems, methods, and mechanisms for coarse selection of CBRS networks may include various triggers for automatic CBRS profile enabling and/or disabling, user management and overriding of system selections, tiered hierarchy for CBRS network enabling and/or disabling, as well as mechanisms to avoid ping-ponging between network selection. As another example, systems, methods, and mechanisms for fine selection of CBRS networks may include data slot switching between mobile network operators (MNOs, e.g., LTE/NR macro cells) and CBRS eSIM as well as prioritization of CBRS networks over Wi-Fi networks. As a further example, systems, methods, and mechanisms for multiple CBRS networks support may include CBRS network identifier (NID) matching for unique identification as well as user-ranked CBRS priority.

As indicated above, in some embodiments, coarse selection may include multiple triggers for automatic CBRS profile enabling and/or CBRS profile disabling. For example, badging into/out of an office space (e.g., such as an office building) may automatically enable and/or disable a corresponding CBRS profile. As another example, camping on/off a Wi-Fi network that is deployed near a CBRS network may automatically enable/disable a CBRS profile corresponding to the CBRS network. Further, entering/exiting a geofence may cause automatic enabling/disabling of a CBRS profile corresponding to a CBRS network associated with the geofence. Additionally, signal loss may cause automatic disabling of a CBRS profile associated with a CBRS network for which the signal has been lost.

Additionally, as indicated above, in some embodiments, coarse selection may also and/or alternatively include user management and overriding of system selections. For example, a user may manually select a CBRS profile to activate, e.g., via a user interface (UI). Note that such a selection may be higher priority than most system triggers. Similarly, a user may manually disable a CBRS profile(s). Note that once disabled, the CBRS profile(s) may be placed on a deny list which may lead to system triggers associated with the disabled CBRS profile(s) being ignored for at least a period of time.

Further, as indicated above, in some embodiments, coarse selection may also and/or alternatively include a tiered hierarchy for CBRS network/profile enabling and/or disabling. For example, a user selection of a CBRS network and/or profile may be given a highest (or first) priority, e.g., geofence, WiFi, and/or badging triggers cannot cause a user-enabled CBRS network/profile to be turned off. Further, geofence may be given a second highest (or second) priority, e.g., geofence enabling/disabling of a CBRS network/profile may override WiFi and/or badging triggers for automatic enabling/disabling of a CBRS network/profile. Additionally, WiFi and/or badging may have a lowest (or third) priority, e.g., WiFi and/or badging may be considered indicators of geofence locations, thus, WiFi triggers may be ignored if and/or when a CBRS network/profile is active due to user selection or geofence trigger. Note that in an absence of location services, machine learning may be used to enable more accurate predictions.

In addition, as indicated above, in some embodiments, coarse selection may also and/or alternatively include mechanisms to avoid ping-ponging between network selection. For example, a trigger of sufficient priority (e.g., higher priority than a trigger used to select a current CBRS network/profile) may cause a stable state timer to be reset. Then, a decision to enable and/or disable a CBRS network/profile may only be evaluated after a stable state is reached and/or when the stable state timer finishes a countdown without reset. Note that such a mechanism may prevent energy drain and service disruptions from frequent enabling and/or disabling of CBRS networks/profiles.

As indicated above, in some embodiments, fine selection may include data slot switching between mobile network operators (MNOs) (e.g., LTE/NR macro cells) and CBRS eSIM. For example, a radio access arbitrator may monitor a variety (e.g., a plurality) of signal quality indicators of MNO and CBRS connections. Additionally, the radio access arbitrator may send data SIM recommendation to a CBRS xontroller, e.g., based on the monitoring of the signal quality indicators of the MNO connection and the CBRS connection. Further, the CBRS controller may consider radio access arbitrator recommendations along with carrier policies and user preferences to select an appropriate eSIM for data. In other words, eSIM selection for data traffic may be based, at least in part, on one or more of signal quality indicators of the MNO connection and the CBRS connection, carrier policies, and/or user preferences.

In addition, as indicated above, in some embodiments, fine selection may also or alternatively include prioritization of CBRS networks over Wi-Fi networks. For example, a radio access arbitrator may monitor signal quality indicators for a WiFi connection as well as signal quality indicators of an MNO connection and a CBRS connection. The radio access arbitrator may compare the signal quality indicators for the WiFi connection to the signal quality indicators of the MNO connection and the CBRS connection. Then, if and/or when the WiFi connection, based on the comparison, is the best connection for data (e.g., as compared to the MNO connection and/or the CBRS connection), the radio access arbitrator may signal a WiFi preference over cellular to a network layer, thus the MNO connection and the CBRS connection may be ignored since both are cellular connections. Further, if and/or when the MNO connection, based on the comparison, is the best connection for data (e.g., as compared to the WiFi connection and/or the CBRS connection), the radio access arbitrator may signal cellular preference over WiFi to the network layer and an MNO preference over CBRS to a CBRS controller. Additionally, if and/or when the CBRS connection, based on the comparison, is the best connection for data (e.g., as compared to the MNO connection and/or the WiFi connection), the radio access arbitrator may signal cellular preference over WiFi to the network layer and an CBRS preference over MNO to a CBRS controller.

Additionally, as indicated above, in some embodiments, multiple CBRS networks support may include CBRS NID matching for unique identification. For example, each CBRS deployment may have a unique NID which is included in geofencing data and/or a CBRS profile associated with the CBRS deployment. Coarse selection may consider the CBRS NID when enabling a CBRS profile (e.g., a CBRS profile with a NID associated with one location or entity will not be enabled when entering a geofence for a NID associated with another location or entity).

Further, as indicated above, in some embodiments, multiple CBRS network support may include user-ranked CBRS priority. For example, upon installing a new CBRS profile, a user may be asked to rank the new CBRS profile against other existing CBRS profiles. Then, automatic activation may prefer a highest-ranked CBRS profile first, e.g., if and/or when automatic activation conditions for multiple CBRS profiles are simultaneously triggered.

Figure 8:
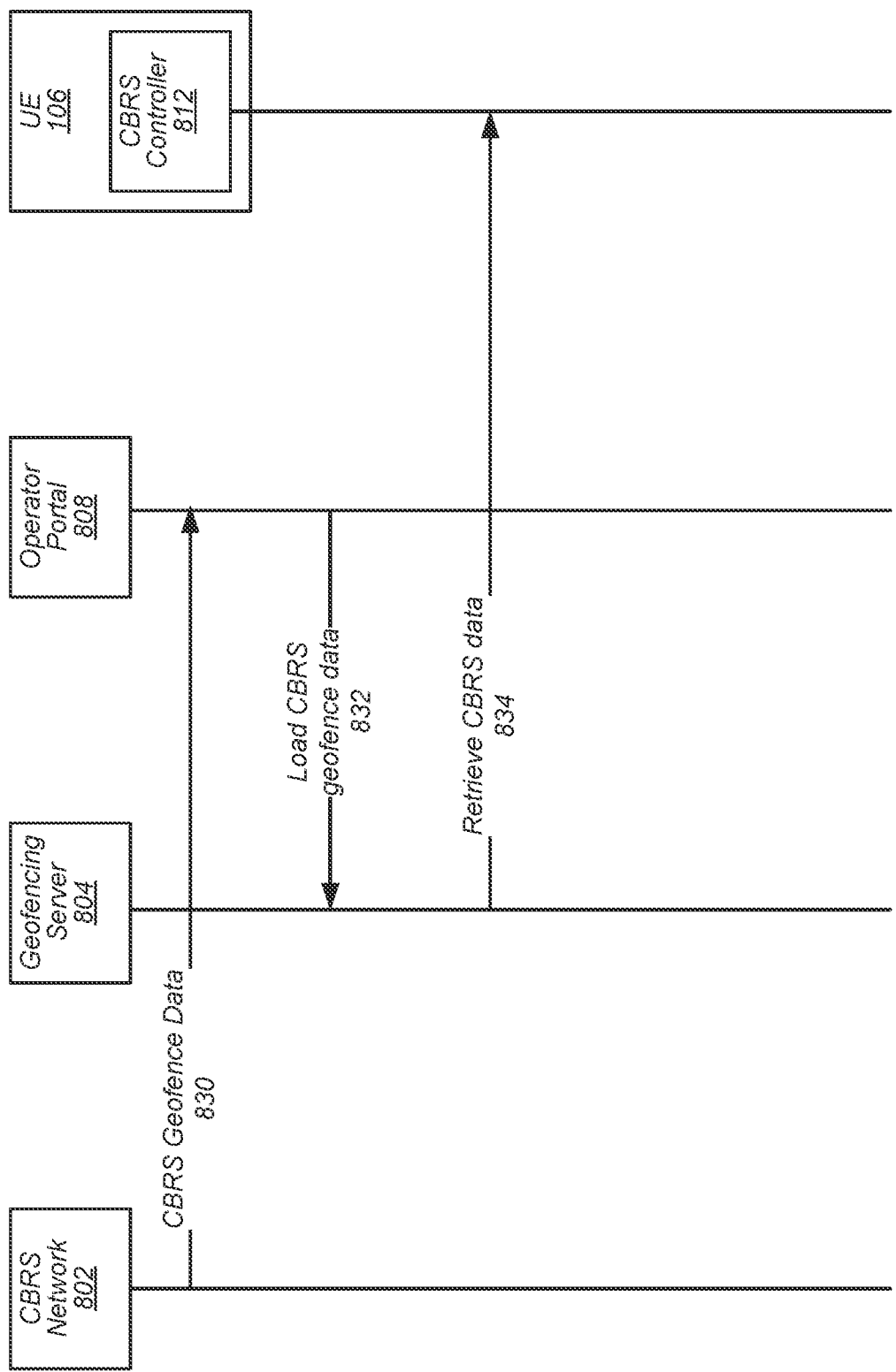
FIG. 8 illustrates an example of signaling for provisioning of one or more CBRS profiles, according to some embodiments.

FIG. 8 illustrates an example of signaling for provisioning of one or more CBRS profiles, according to some embodiments. The signaling shown in FIG. 8 may be used in conjunction with any of the systems, methods, or devices shown in the Figures, among other devices. In various embodiments, some of the signaling shown may be performed concurrently, in a different order than shown, or may be omitted. Additional signaling may also be performed as desired. As shown, this signaling may flow as follows.

At 830, a CBRS network 802, e.g., a base station and/or access point of the CBRS network 802, may send and/or provide CBRS geofence data 830 to an operator portal 808, e.g., a server of an operator of the CBRS network. The geofence data 830 may include various information associated with the location of the CBRS network 802, e.g., such as coordinates of boundary locations, a network name, a base station identifier (ID) and/or name, a band and/or Absolute Radio Frequency Channel (ARFCN), Shared Home. Network Identifier (SHNI) and/or Public Land Mobile Network (PLMN) ID, tracking area code (TAC), cell ID, CBRS network ID (NID), latitude, longitude, altitude, radius, and/or a list of co-located WiFi Service Set Identifiers (SSIDs), among other information. Note that the operator portal 808 may be a third party server, e.g., such as a server 104.

Then, the operator portal 808 may send and/or provide the geofence data to a geofencing data server 804, e.g., via a load geofencing data operation 832. Thus, the operator portal 808 may provide the geofencing data server 804 with the CBRS geofence data 830 received from CBRS network 802.

Further, a CBRS controller 812 of a UE, such as UE 106, may retrieve CBRS geofence data from the geofencing data server 804. Note that the particular CBRS geofence data retrieved from the geofencing data server 804 may be based, at least in part, on an installed CBRS profile and/or installed CBRS profiles on an eSIM of the UE. In such a manner, one or more CBRS profiles may be provisioned for use by the UE.

Figure 9A:
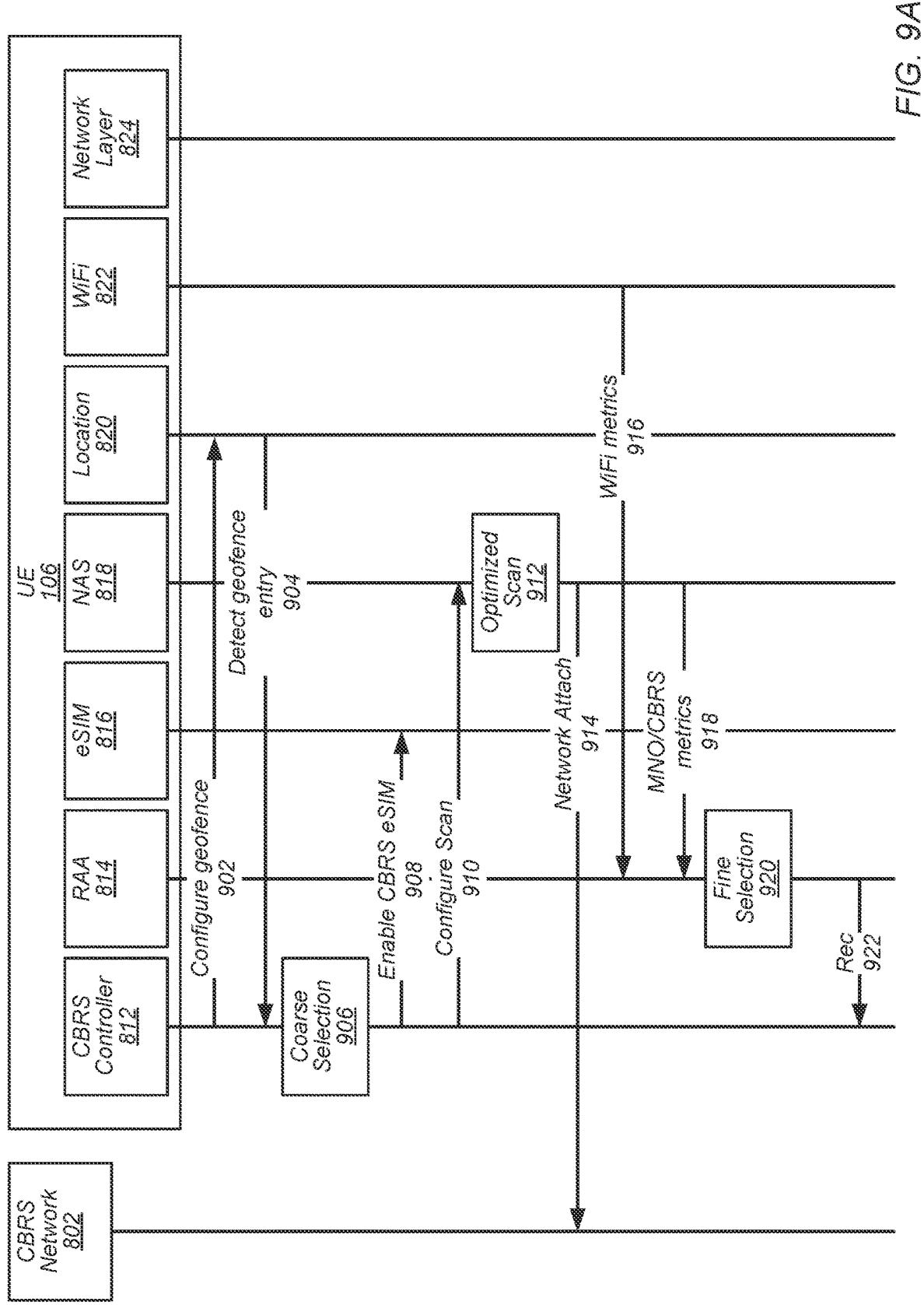

FIGS. 9A and 9B illustrate an example of signaling for selection of a CBRS network based on one or more provisioned CBRS profiles, according to some embodiments. The signaling shown in FIGS. 9A and 9B may be used in conjunction with any of the systems, methods, or devices shown in the Figures, among other devices. In various embodiments, some of the signaling shown may be performed concurrently, in a different order than shown, or may be omitted. Additional signaling may also be performed as desired. As shown, this signaling may flow as follows.

A CBRS controller 812, once provisioned with one or more CBRS profiles, e.g., as described above with reference to FIG. 8, may configure a geofence location, e.g., based on the geofence data received from the geofence server 804. Thus, the CBRS controller 812 may configure a geofence with location module 820 of a UE, such as UE 106, based on provisioned CBRS profiles, via geofence configure operation 902. Thus, the location module 820 may be configured to detect entry and exit from a geofence associated with provisioned CBRS profiles.

Then, upon detection of an entry into a geofence associated with a provisioned CBRS profile, the location module 820 may notify the CBRS controller 812 of geofence entry (e.g., geofence entry detection 904).

At 906, CBRS controller 812 may perform coarse selection, e.g., as further described below in reference to FIGS. 14, 15A, and 15B. For example, CBRS controller 812 may monitor for various triggers for automatic CBRS profile enabling and/or disabling, perform user management and overriding of system selections, and implement tiered hierarchy for CBRS network enabling and/or disabling, as well as implement mechanisms to avoid ping-ponging between network selections.

After performing coarse selection 906, CBRS controller 812 may enable a selected CBRS profile by notifying eSIM 816 (e.g., a baseband eSIM of UE 106) via enable CBRS eSIM message 908.

Further, CBRS controller 812 may configure a band scan, e.g., based on the provisioned CBRS profile (e.g., based on the geofence data included in the provisioned CBRS profile) and notify a baseband network access stratum (NAS) layer of the UE (e.g., NAS 818) of the configuration via configure scan message 910.

At 912, NAS 818 may perform a band scan, e.g., based on the configuration received from CBRS controller 812. Then, based on the band scan, NAS 818 may perform network attachment 914.

Further, a radio access arbitrator (e.g., RAA 814) of UE 106 may receive WiFi signal quality metrics 916 from WiFi layer 822 of UE 106 as well as CBRS signal quality metrics and MNO signal quality metrics 918 from NAS 818.

Figure 16:
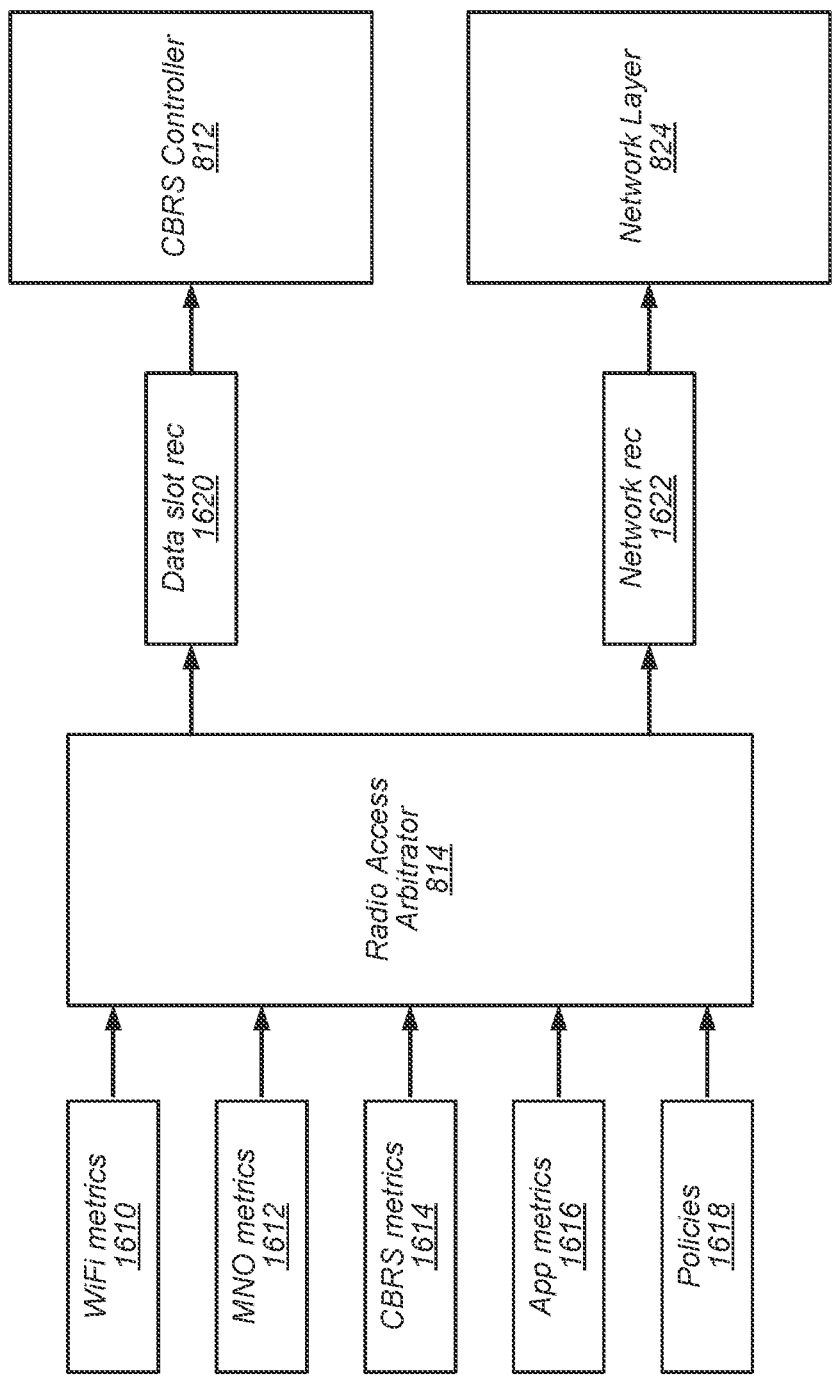
FIG. 16 illustrates an example of a block diagram of a method for a radio resource arbitrator to perform various operations, according to some embodiments.

At 920, RAA 814 may perform fine selection, e.g., as further described in reference to FIG. 16. For example, RAA 814 may perform data slot switching between MNOs (e.g., LTE/NR macro cells) and CBRS eSIM as well as prioritization of CBRS networks over Wi-Fi networks. Then, based on the fine selection, RAA 814 may send recommendation 922 to CBRS controller 812. The recommendation 922 may indicate whether to use an MNO or the CBRS profile.

Continuing to FIG. 9B, based on the recommendation (e.g., when the recommendation indicates to use the CBRS profile), CBRS controller 812 may send a command 924 to NAS 818 to switch data to CBRS. Additionally, CBRS controller 812 may send a command 926 to networking layer 824 of UE 106 to prefer cellular over WiFi.

Location module 820 may monitor the location of UE 106 in comparison to the geofence associated with the CBRS profile in use. Upon detection of an exit from the geofence area, location module 820 may send a notification 928 to CBRS controller 812 indicating exit from the geofence. Based on the notification, CBRS controller 812 may send a command 930 to eSIM 816 disabling the CBRS profile in use. Further, based on the notification, CBRS controller 812 may send a command 932 to NAS 818 to switch data to MNO. Finally, based on the notification, CBRS controller 812 may send a command 932 to WiFi layer 822 to prefer WiFi over cellular for data transmission.

Figure 10:
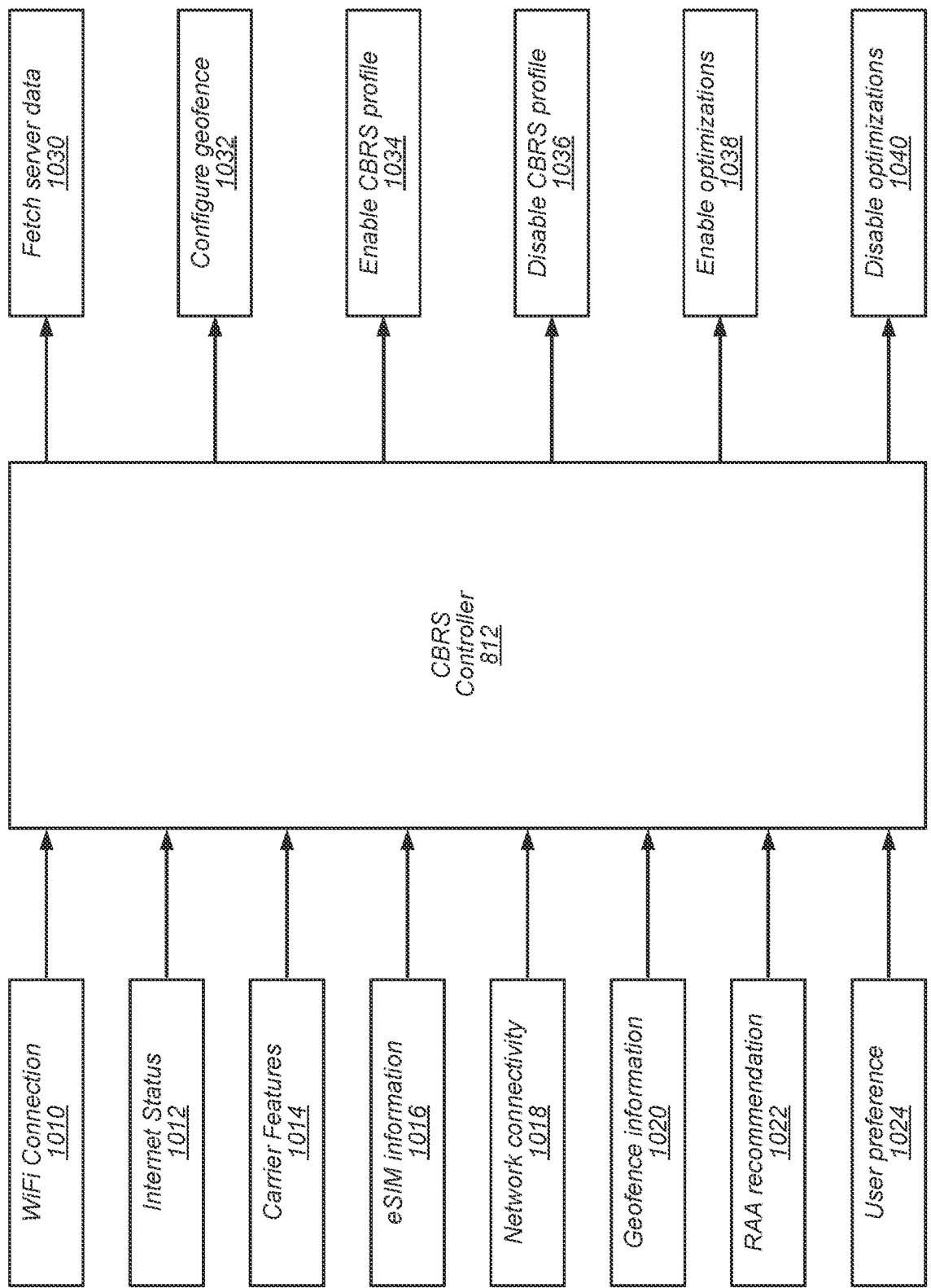
FIG. 10 illustrates an example of a block diagram of a method for a CBRS controller to perform various operations, according to some embodiments.

FIG. 10 illustrates an example of a block diagram of a method for a CBRS controller to perform various operations, according to some embodiments. The method shown in FIG. 10 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

CBRS controller 812 may receive inputs from various components/layers of a UE, such as UE 106, and may perform and/or command various actions based on the inputs e.g., as described above in reference to FIGS. 9A-9B. For example, at 1010, CBRS controller 812 may receive WiFi connection information (e.g., such as signal quality metrics of received WiFi signals). At 1012, CBRS controller 812 may receive internet status (e.g., active sessions, connection status, and so forth). At 1014, CBRS controller 812 may receive carrier features (e.g., CBRS features supported by a MNO, e.g., from a carrier server). At 1016, CBRS controller 812 may receive eSIM information (e.g., such as available/disabled CBRS profiles, active CBRS profile). At 1018, CBRS controller 812 may receive network connectivity information (e.g., bands and network types available for connection). At 1020, CBRS controller 812 may receive geofence information (e.g., such as entry and/or exit from a geofence area/location). At 1022, CBRS controller 812 may receive radio access arbitrator (RAA) recommendations (e.g., data slot recommendations). At 1024, CBRS controller 812 may receive user preferences (e.g., user selections associated with CBRS). Further, based on the received inputs, CBRS controller 812 may perform and/or command various actions. For example, at 1030, CBRS controller 812 may fetch server data (e.g., to update one or more CBRS profiles). At 1032, CBRS controller 812 may perform geofence configuration (e.g., based on available CBRS profiles). At 1034, CBRS controller 812 may enable a CBRS profile (e.g., based on WiFi, geofence detection, and/or user preference). At 1036, CBRS controller 812 may disable a CBRS profile (e.g., based on WiFi, geofence detection, registration status, and/or user preference). At 1038, CBRS controller 812 may enable optimizations. At 1040, CBRS controller 812 may disable optimizations.

Note that in addition to retrieving and/or fetching geofence data from various servers such as a geofencing server (e.g., a central server or a server identifiable via a network ID), a private server (e.g., a central server hosted by a UE manufacturer) or an entitlement server (e.g., a server hosted by an MNO), a UE, e.g., a CBRS controller of a UE, may receive geofence data via a mobile device management (MDM) command, an installation of a configuration profile, embedded carrier configuration files, and/or a public application. FIGS. 11, 12A, 12B, 13A, and 13B illustrate various methods for CBRS profile retrieval from a server as well as methods for updating a server of CBRS profile changes.

Figure 11:
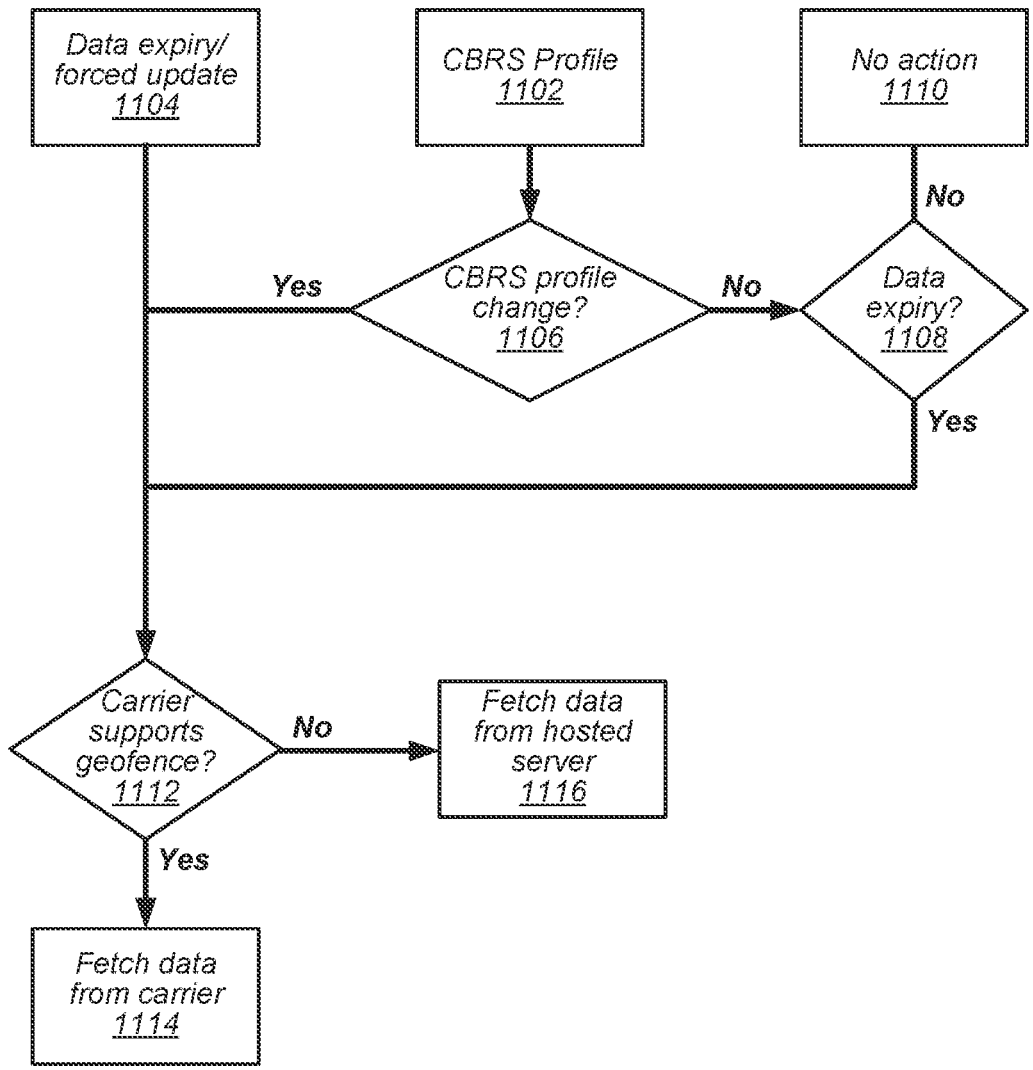
FIG. 11 illustrates an example of a block diagram of a method for a CBRS profile change or update, according to some embodiments.

FIG. 11 illustrates an example of a block diagram of a method for a CBRS profile change or update, according to some embodiments. The method shown in FIG. 11 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1102, a UE, such as UE 106, may detect a CBRS profile and/or at 1104, the UE may determine that a CBRS profile has expired and/or that the UE has received a command to update the CBRS profile (e.g., a forced update).

At 1106, in response to detecting the CBRS profile, the UE may determine whether the CBRS profile has changed.

At 1108, in response to determining that the CBRS profile has not changed, the UE may determine whether the CBRS profile has expired.

At 1110, in response to determining that the CBRS profile has not changed, the UE may take no action regarding the CBRS profile.

At 1112, in response to determining that the CBRS profile has changed and/or in response to determining that a CBRS profile has expired and/or that the UE has received a command to update the CBRS profile, the UE may determine whether a carrier (e.g., via query to an entitlements server of the carrier) supports geofence data.

At 1114, in response to determining that the carrier supports geofence data, the UE may fetch and/or retrieve the geofence data from the carrier.

At 1116, in response to determining that the carrier does not support geofence data, the UE may fetch and/or retrieved the geofence data from a server hosted by a manufacturer of the UE.

Figure 12A:
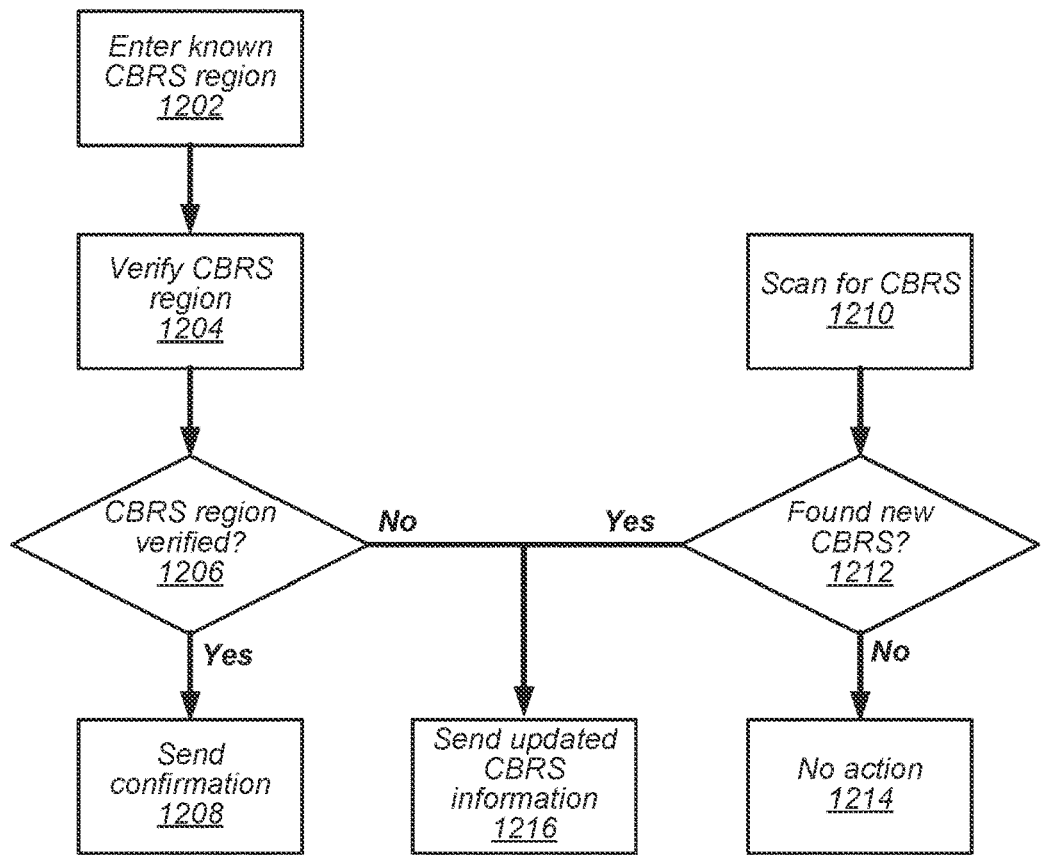
FIG. 12A illustrates an example of a block diagram of a method for on device learning of geofence data, according to some embodiments.

FIG. 12A illustrates an example of a block diagram of a method for on device learning of geofence data, according to some embodiments. The method shown in FIG. 12A may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1202, a UE, such as UE 106 may enter a known CBRS region. For example, the UE may detect entry into a geofence location of a known CBRS region.

At 1204, the UE may be requested (e.g., by an MNO or some other entity) to verify the CBRS region.

At 1206, the UE may attempt to verify the CBRS region.

At 1208, in response to verifying the CBRS region, the UE may send a confirmation to a server.

Alternatively, at 1210, the UE may be requested to scan for a CBRS region, e.g., based on a current location of the UE.

At 1212, in response to the request to scan for the CBRS region, the UE may determine whether a new CBRS region has been located.

At 1214, in response to not locating a new CBRS, the UE may take no further action.

Alternatively, at 1216, in response to locating a new CBRS and/or in response to not verifying the CBRS region (e.g., at 1206), the UE may send updated CBRS information to the sever.

Figure 12B:
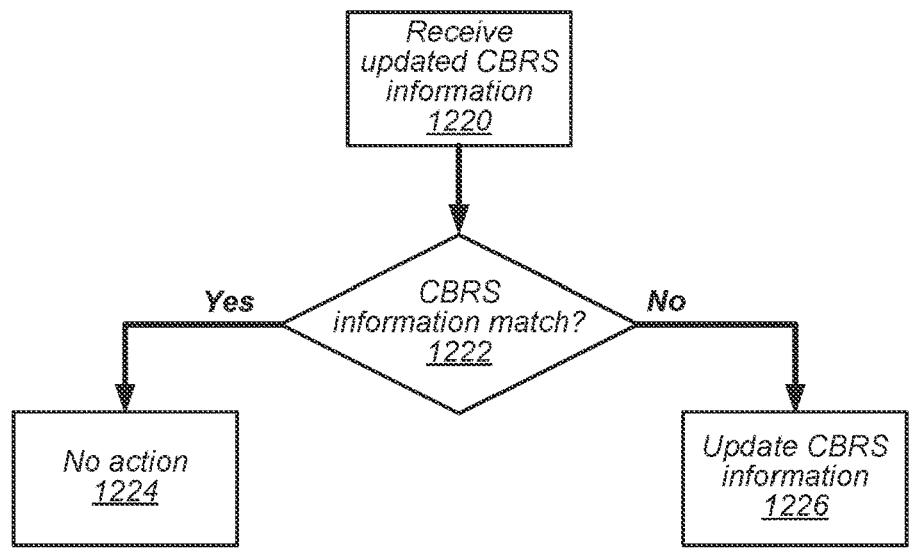
FIG. 12B illustrates an example of a block diagram of a method for updating a geofence server based on device learning of geofence data, according to some embodiments.

FIG. 12B illustrates an example of a block diagram of a method for updating a geofence server based on device learning of geofence data, according to some embodiments. The method shown in FIG. 12B may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1220, a server, such as server 104, may receive, from a UE, such as UE 106, updated CBRS information.

At 1222, the server may determine whether the updated CBRS information matches any CBRS information stored on the server.

At 1224, in response to determining a match, the sever may take no further action.

Alternatively, at 1226, in response to determining that there is not a match, the server may record (e.g., store) the updated CBRS information.

Figure 13A:
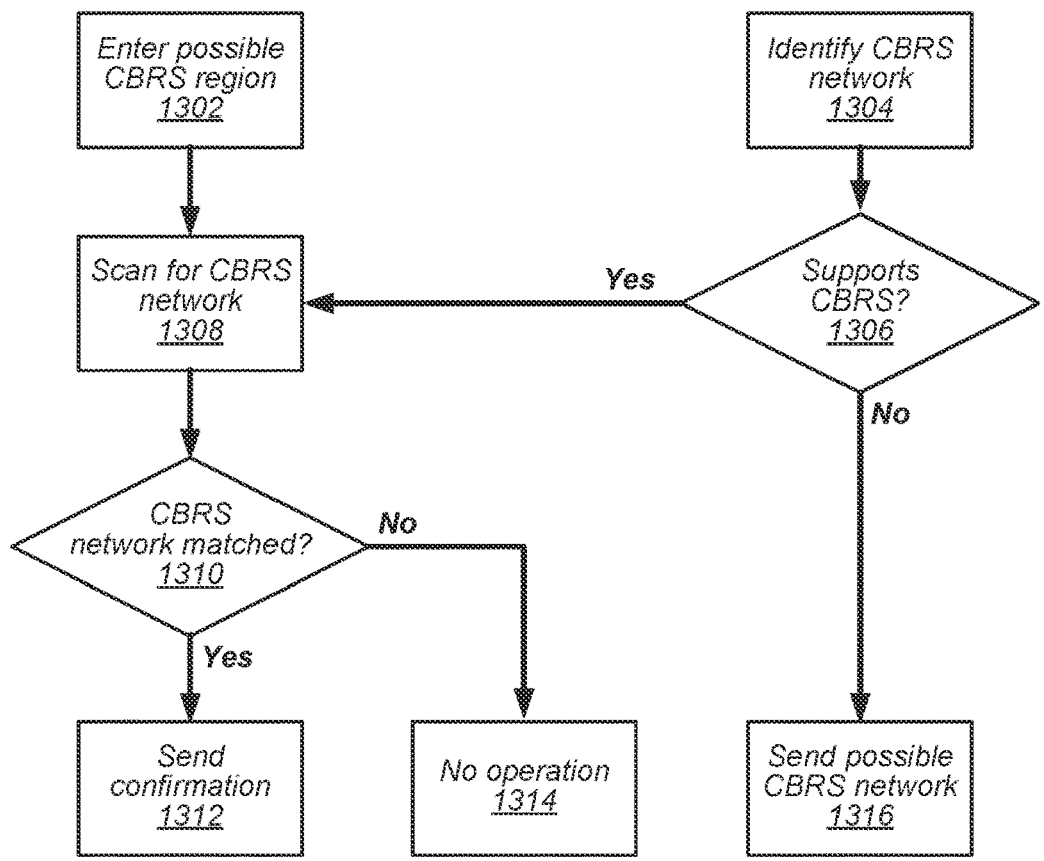
FIG. 13A illustrates an example of a block diagram of a method for crowd sourced updates geofence data, according to some embodiments.

FIG. 13A illustrates an example of a block diagram of a method for crowd sourced updates of geofence data, according to some embodiments. The method shown in FIG. 13A may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1302, a UE, such as UE 106 may enter a possible CBRS region. For example, the UE may detect entry into a geofence location of a possible CBRS region. Further, based on location of the UE, the UE may be requested (e.g., randomly) to scan for a CBRS network.

Alternatively, at 1304, a user of the UE may detect a CBRS network (either in band or out of band).

At 1306, the UE may determine whether the UE supports CBRS.

At 1308, in response to determining that the UE supports CBRS and/or in response to a request to scan for the CBRS network, the UE may scan for the CBRS network.

At 1310, the UE may determine whether the scan found a CBRS network and/or whether the found CBRS network matches the identified CBRS network and/or possible CBRS network.

At 1312, in response to determining that the scan found the CBRS network and/or that the found CBRS network matches the identified CBRS network and/or possible CBRS network, the UE may send a confirmation to a server.

Alternatively, at 1314, in response to determining that the scan did not find the CBRS network and/or did not find that the CBRS network matches the identified CBRS network and/or possible CBRS network, the UE may take no further action.

Additionally, at 1316, in response to determining that the UE does not support CBRS, the UE may send the possible CBRS network to the server.

Figure 13B:
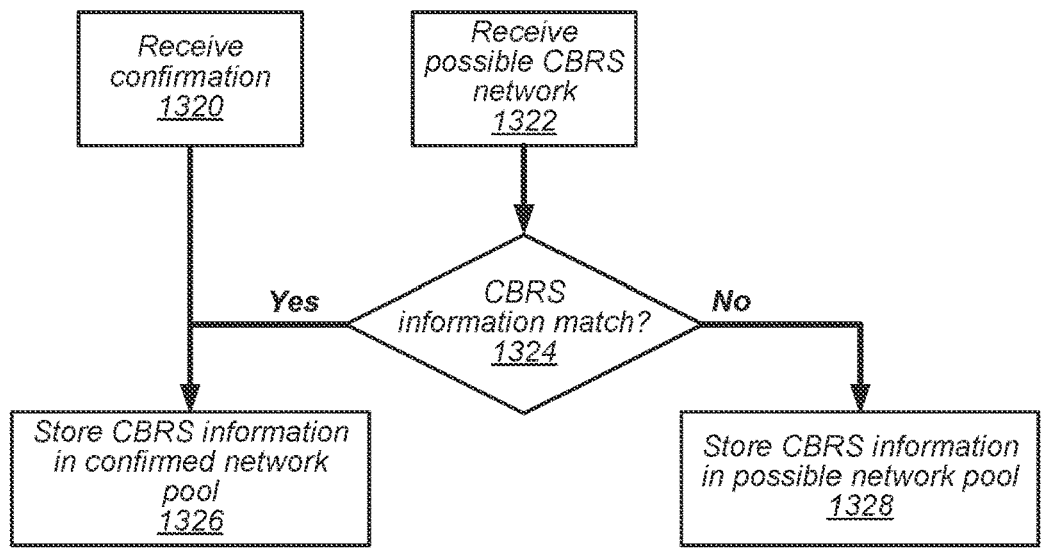
FIG. 13B illustrates an example of a block diagram of a method for updating a geofence server based on crowd sourced geofence data, according to some embodiments.

FIG. 13B illustrates an example of a block diagram of a method for updating a geofence server based on crowd sourced geofence data, according to some embodiments. The method shown in FIG. 13B may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1320, a server, such as server 104, may receive, from a UE, such as UE 106, a confirmation of CBRS network location.

Alternatively, at 1322, the server may receive, from the UE, an indication of a possible CBRS network location.

At 1324, the server may compare the possible CBRS network location to CBRS network locations stored on the server.

At 1326, in response to receiving the confirmation of CBRS network location and/or in response to determining that the possible CBRS network location matches a CBRS network location stored on the server, the server may store the CBRS information in a confirmed network pool (e.g., a data structure containing confirmed CBRS information).

Alternatively, at 1328, in response to determining that the possible CBRS network location does not match a CBRS network location stored on the server, the server may store the CBRS information in a possible network pool (e.g., a data structure containing possible (e.g., unconfirmed) CBRS information). Note that data in the possible network pool may be removed periodically if not confirmed by another UE within a specified period of time.

Figure 14:
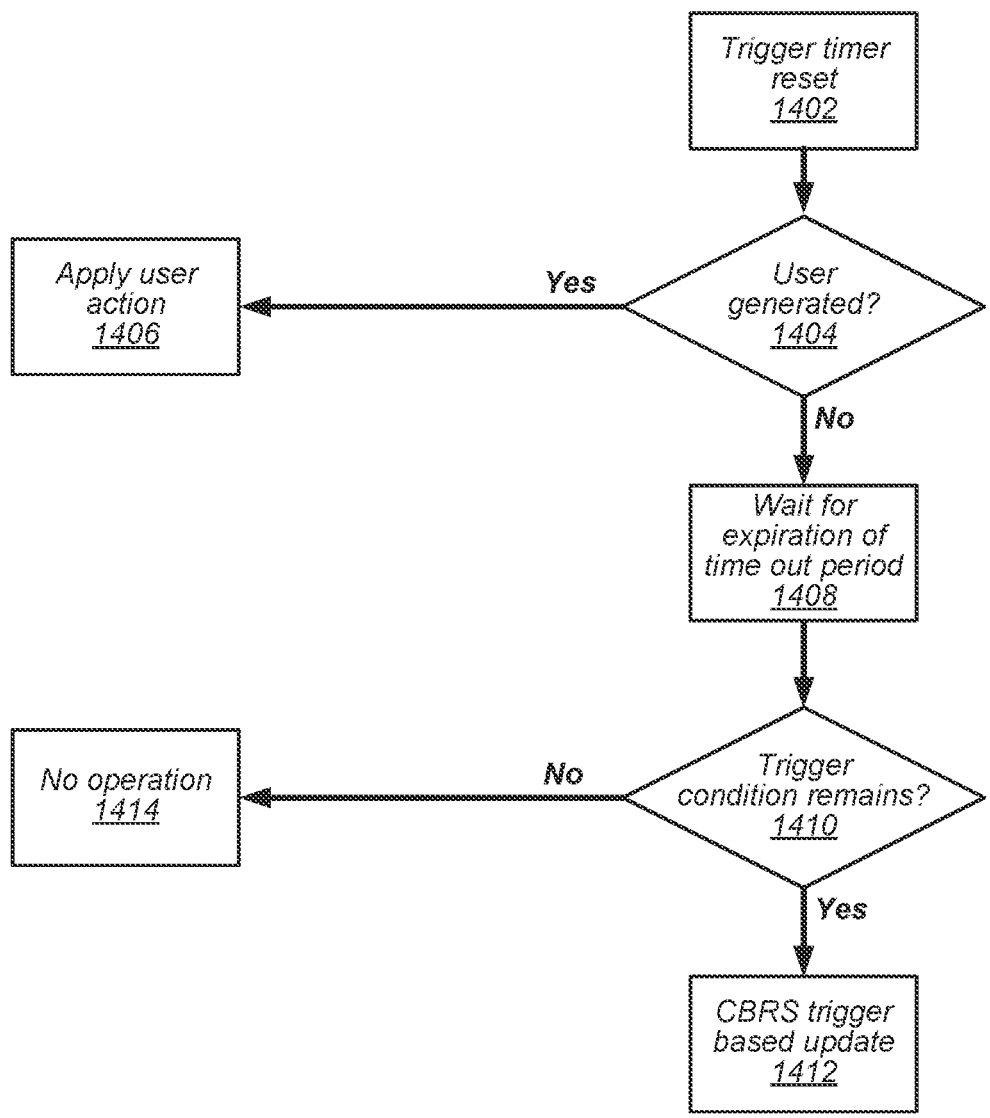
FIG. 14 illustrates an example of a block diagram of a method for avoiding rapid switching between enabling and/or disabling a CBRS profile, according to some embodiments.

FIG. 14 illustrates an example of a block diagram of a method for avoiding rapid switching (e.g., ping-ponging) between enabling and/or disabling a CBRS profile, according to some embodiments. The method shown in FIG. 14 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1402, a trigger condition associated with CBRS profile enablement/disablement may be detected, e.g., by a UE and/or by a CBRS controller of a UE. The trigger condition may be based on UE mobility state and/or a type of trigger. In some embodiments, trigger conditions to disable a CBRS profile may include the UE stopping camping on a WiFi network co-located with a CBRS network associated with the CBRS profile and/or the UE badging out of a location (e.g., office), the UE exiting a geofence location, a user of the UE turning of CBRS, and/or a loss of a CBRS signal. In some embodiments, trigger conditions to enable a CBRS profile may include the UE camping on a WiFi network co-located with a CBRS network associated with the CBRS profile and/or the UE badging into a location (e.g., office), the UE entering a geofence location, and/or a user turning on CBRS. Note that any trigger of sufficient priority may cause entry into the method (e.g., algorithm). Note further that trigger conditions may be prioritized base on trigger type. For example, a user generated trigger condition may be given a highest priority whereas a WiFi/badge associated trigger condition may be given a lowest priority. Further, a geofence associated trigger condition may be given a priority between the highest priority and the lowest priority.

At 1404, the UE may determine whether the trigger was user generated.

At 1406, in response to determining that the trigger was user generated, the UE may apply a user action associated with the trigger condition.

At 1408, in response to determining that the trigger was not user generated, the UE may wait for a specified time period, e.g., a hysteresis timer.

At 1410, the UE may determine whether the trigger condition persists (e.g., remains).

At 1412, in response to determining that the trigger condition persists, the UE may perform a CBRS update (e.g., CBRS profile enablement/disablement) based on the trigger condition.

At 1414, in response to determining that the trigger condition does not persist, the UE may take no further action. In this manner, the UE may avoid energy drain and/or service disruptions associated with frequent CBRS profile enablement/disablement.

In some embodiments, an action that the UE takes resulting from the trigger condition may depend on a previous CBRS state. For example, when a trigger condition attempts to disable a CBRS profile, the triggering condition will be ignored when the previous CBRS state is inactive. As another example, when a trigger condition attempts to disable a CBRS profile and the previous CBRS state was WiFi enabled/badge enabled, the UE may enter the hysteresis cycle described above in reference to FIG. 14 when the triggering condition is any of the UE stopping camping on a WiFi network co-located with a CBRS network associated with the CBRS profile and/or the UE badging out of a location (e.g., office), the UE exiting a geofence location, and/or a loss of a CBRS signal. Note that when a trigger condition attempts to disable a CBRS profile and the previous CBRS state was WiFi enabled/badge enabled, the UE may turn off the CBRS immediately when the trigger condition is the user turning off CBRS. As a further example, when a trigger condition attempts to disable a CBRS profile and the previous CBRS state was geofence enabled, the UE may enter the hysteresis cycle described above in reference to FIG. 14 when the triggering condition is the UE exiting a geofence location and/or a loss of a CBRS signal. Note that when a trigger condition attempts to disable a CBRS profile and the previous CBRS state was geofence enabled, the UE may ignore the trigger condition when the trigger condition is the UE stopping camping on a WiFi network co-located with a CBRS network associated with the CBRS profile and/or the UE badging out of a location (e.g., office). Note further that when a trigger condition attempts to disable a CBRS profile and the previous CBRS state was geofence enabled, the UE may turn off the CBRS immediately when the trigger condition is the user turning off CBRS. As another further example, when a trigger condition attempts to disable a CBRS profile and the previous CBRS state was user enabled, the UE may ignore the trigger condition when the trigger condition is the UE stopping camping on a WiFi network co-located with a CBRS network associated with the CBRS profile and/or the UE badging out of a location (e.g., office) or the UE exiting a geofence location. Further, when a trigger condition attempts to disable a CBRS profile and the previous CBRS state was user enabled, the UE may enter the hysteresis cycle described above in reference to FIG. 14 when the triggering condition is a loss of a CBRS signal. Additionally, when a trigger condition attempts to disable a CBRS profile and the previous CBRS state was user enabled, the UE may turn off the CBRS immediately when the trigger condition is the user turning off CBRS.

As a yet further example, when a trigger condition attempts to enable a CBRS profile and the previous CBRS state was inactive, the UE may enter the hysteresis cycle described above in reference to FIG. 14 when the trigger condition is the UE camping on a WiFi network co-located with a CBRS network associated with the CBRS profile and/or the UE badging into a location (e.g., office) or the UE entering a geofence location. Note that when a trigger condition attempts to enable a CBRS profile and the previous CBRS state was inactive, the UE may immediately turn on CBRS when the trigger condition is a user turning on CBRS. As another example, when a trigger condition attempts to enable a CBRS profile and the previous CBRS state was WiFi enabled/badge enabled, the UE may enter the hysteresis cycle described above in reference to Figure when the trigger condition is the UE entering a geofence location. Note that when a trigger condition attempts to enable a CBRS profile and the previous CBRS state was WiFi enabled/badge enabled, the UE may immediately turn on CBRS when the trigger condition is a user turning on CBRS. Note further, that when a trigger condition attempts to enable a CBRS profile and the previous CBRS state was WiFi enabled/badge enabled, the UE may ignore the trigger condition when the trigger condition is the UE camping on a WiFi network co-located with a CBRS network associated with the CBRS profile and/or the UE badging into a location (e.g., office). As a further example, when a trigger condition attempts to enable a CBRS profile and the previous CBRS state was geofence enabled or user enabled, the UE may ignore the trigger condition when the trigger condition is the UE camping on a WiFi network co-located with a CBRS network associated with the CBRS profile and/or the UE badging into a location (e.g., office) or the UE entering a geofence location. Note that when a trigger condition attempts to enable a CBRS profile and the previous CBRS state was geofence enabled or user enabled, the UE may immediately turn on CBRS when the trigger condition is a user turning on CBRS.

Figure 15A:
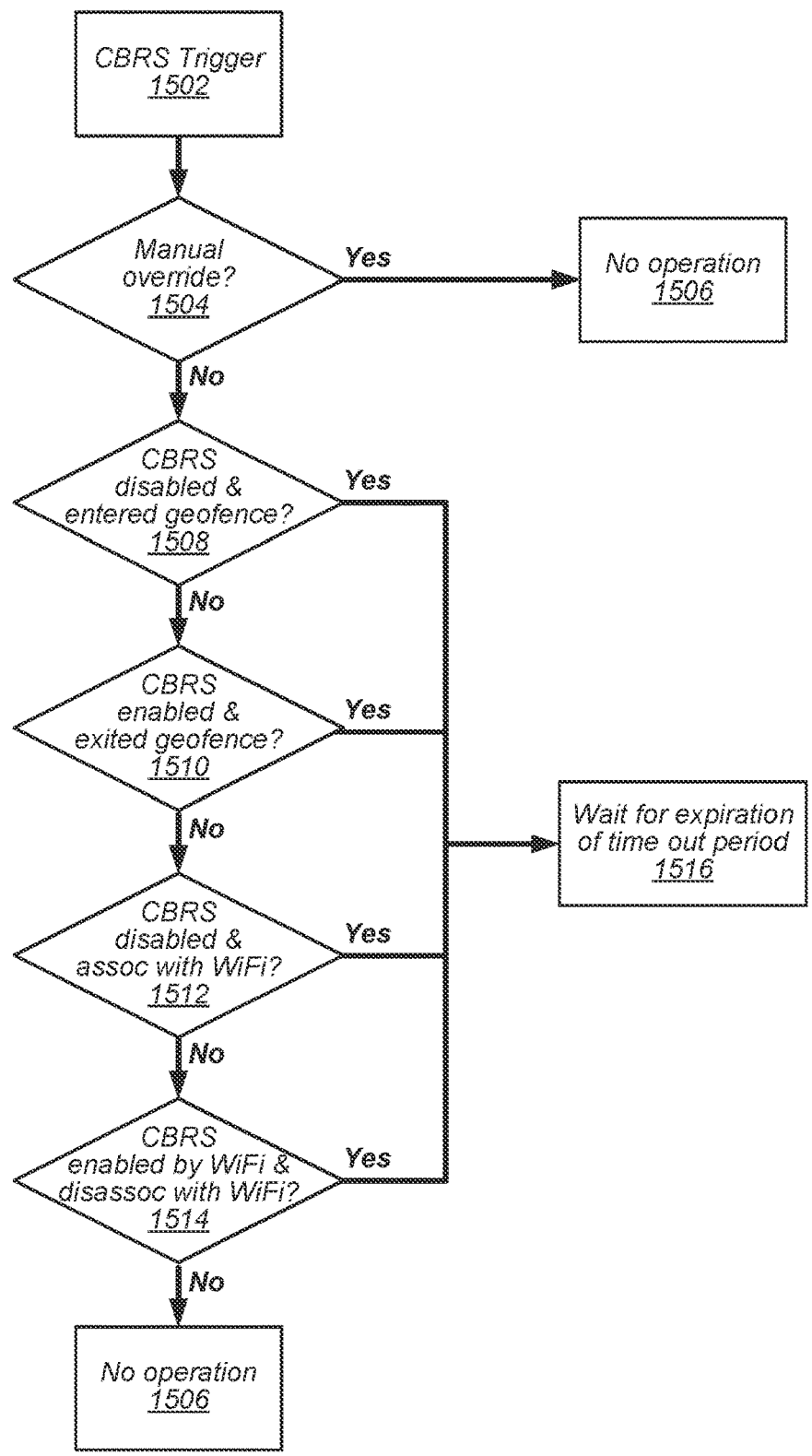
FIGS. 15A and 15B illustrate an example of a block diagram of a method for triggered coarse selection of a CBRS profile, according to some embodiments.
Figure 15B:
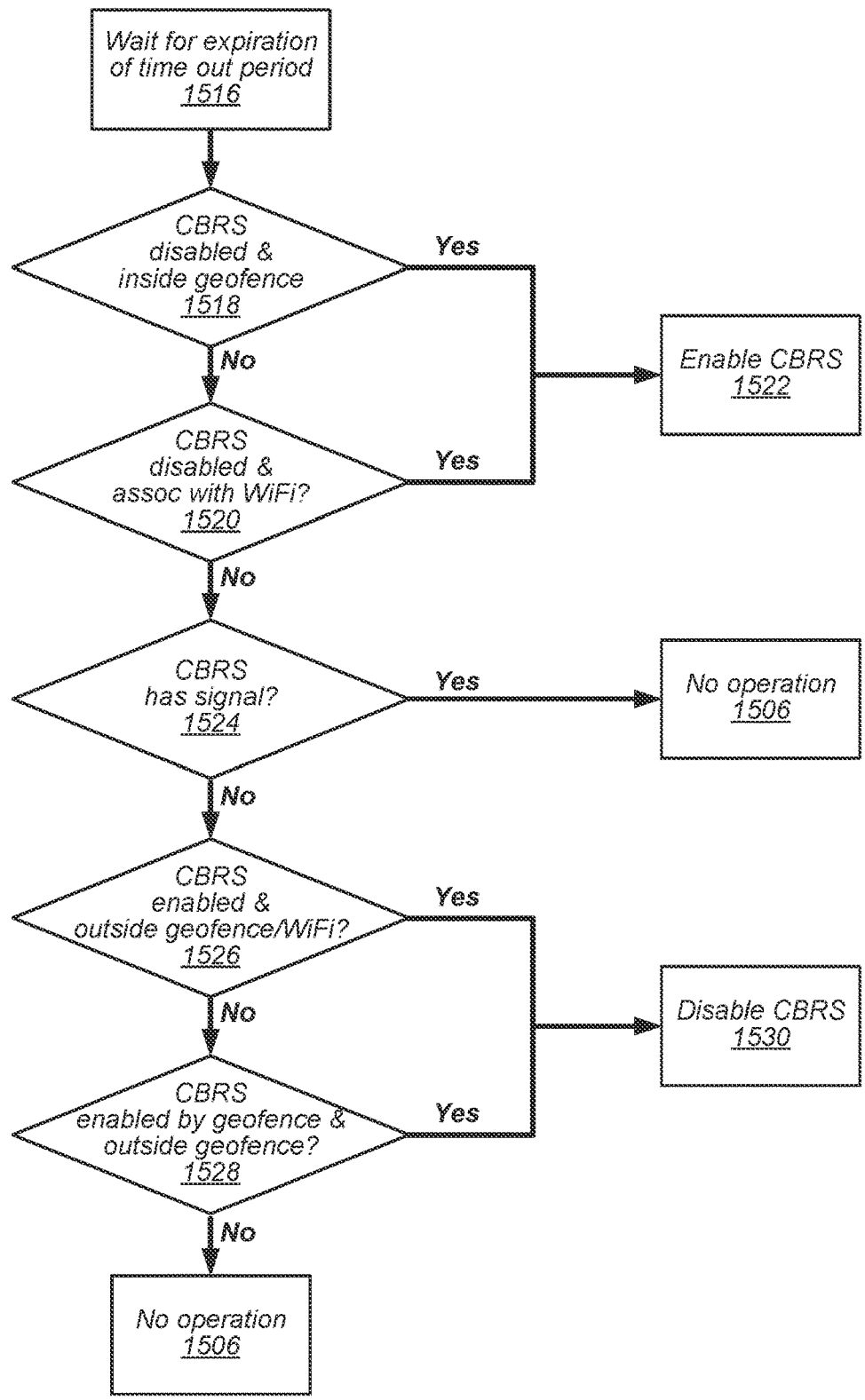

FIGS. 15A and 15B illustrate an example of a block diagram of a method for triggered coarse selection of a CBRS profile, according to some embodiments. The method shown in FIGS. 15A and 15B may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1502, a UE (e.g., a CBRS controller of a UE, such as UE 106) may detect a CBRS trigger condition, e.g., as described above.

At 1504, the UE may determine if any user selection (e.g., manual override) requires the UE to ignore the trigger, e.g., as described above.

At 1506, in response to determining that there is a user selection (e.g., manual override) that requires the UE to ignore the trigger, the UE ignores the trigger.

At 1508, in response to determining that there is not a user selection (e.g., manual override) that requires the UE to ignore the trigger, the UE may determine whether CBRS is disabled and whether the trigger condition is entry into a geofence location.

At 1510, in response to determining at least one of that CBRS is not disabled or that the trigger condition is not entry into a geofence location, the UE may determine whether CBRS is enabled and whether the trigger condition is exiting a geofence location.

At 1512, in response to determining at least one of that CBRS is not enabled or that the trigger condition is not exiting a geofence location, the UE may determine whether CBRS is disabled and whether the trigger condition is association with a WiFi network co-located with the CBRS network.

At 1514, in response to determining at least one of that CBRS is not disabled or that the trigger condition is not association with a WiFi network co-located with the CBRS network, the UE may determine whether CBRS is enabled and whether the trigger condition is disassociation with a WiFi network co-located with the CBRS network.

At 1516, in response to determining at least one of CBRS is disabled and the trigger condition is entry into a geofence location, CBRS is enabled and the trigger condition is exiting a geofence location, CBRS is disabled and the trigger condition is association with a WiFi network co-located with the CBRS network, or CBRS is enabled and the trigger condition is disassociation with a WiFi network co-located with the CBRS network, the UE may wait for expiration of a time out period (e.g., wait for expiration of a hysteresis timer as described above).

Alternatively, in response to determining at least one of that CBRS is not enabled or the trigger condition is not disassociation with a WiFi network co-located with the CBRS network, the UE may ignore the trigger condition at 1506.

Continuing with FIG. 15B, after waiting for the timeout period to expire the UE, at 1518, the UE may determine whether CBRS is disabled and whether the UE is within a geofence location.

At 1520, in response to determining at least one of that CBRS is not disabled or the UE is not within a geofence location, the UE may determine whether CBRS is disabled and whether the UE is associated with a WiFi network co-located with the CBRS network.

At 1522, in response to determining at least one of that CBRS is disabled and that the UE is within a geofence location or that CBRS is disabled and that the UE is associated with a WiFi network co-located with the CBRS network, the UE may enable CBRS.

At 1524, in response to determining at least one of that CBRS is not disabled or that the UE is not associated with a WiFi network co-located with the CBRS network, the UE may determine whether the UE detects a CBRS signal.

In response to determining that the UE detects a CBRS signal, the UE may perform no further operations at 1506.

At 1526, in response to determining that the UE does not detect a CBRS signal, the UE may determine whether CBRS is enabled and whether the UE is outside a geofence location and/or outside of a WiFi network co-located with the CBRS network.

At 1528, in response to determining at least one of that CBRS is not enabled or whether the UE is not outside a geofence location, the UE may determine whether CBRS is enabled by geofence detection and whether the UE outside a geofence location.

At 1530, in response to determining at least one of that CBRS is enabled and the UE is outside a geofence location and/or outside of a WiFi network co-located with the CBRS network or that CBRS is enabled by geofence detection and the UE is outside a geofence location, the UE may disable CBRS.

In response to determining at least one of that CBRS is not enabled by geofence detection or the UE is not outside a geofence location, the UE may ignore the trigger at 1506.

FIG. 16 illustrates an example of a block diagram of a method for a radio resource arbitrator to perform various operations, according to some embodiments. The method shown in FIG. 16 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1610, a radio access arbitrator 814 of a UE, such as UE 106, may receive WiFi signal quality metrics, e.g., from a WiFi layer/interface of the UE.

At 1612, the radio access arbitrator 814 may receive MNO (e.g., cellular, such as LTE and/or NR) signal quality metrics, e.g., from a NAS layer/interface of the UE.

At 1614, the radio access arbitrator 814 may receive CBRS signal quality metrics, e.g., from the NAS layer/interface of the UE.

At 1616, the radio access arbitrator 814 may receive application metrics, e.g., such as quality of service requirements, current internet session connections, and so forth from an application executing on the UE.

At 1618, the radio access arbitrator 814 may receive network policies, e.g., such as preferences of the CBRS network and/or carrier.

At 1620, based on the received metrics and/or policies, the radio access arbitrator 814 may determine whether to recommend CBRS slots or MNO slots and send the recommendation to a CBRS controller 812 of the UE.

At 1622, radio access arbitrator 814 may determine whether to prefer cellular or WiFi for data and may send the preference to a network layer 824 of the UE.

Figure 17:
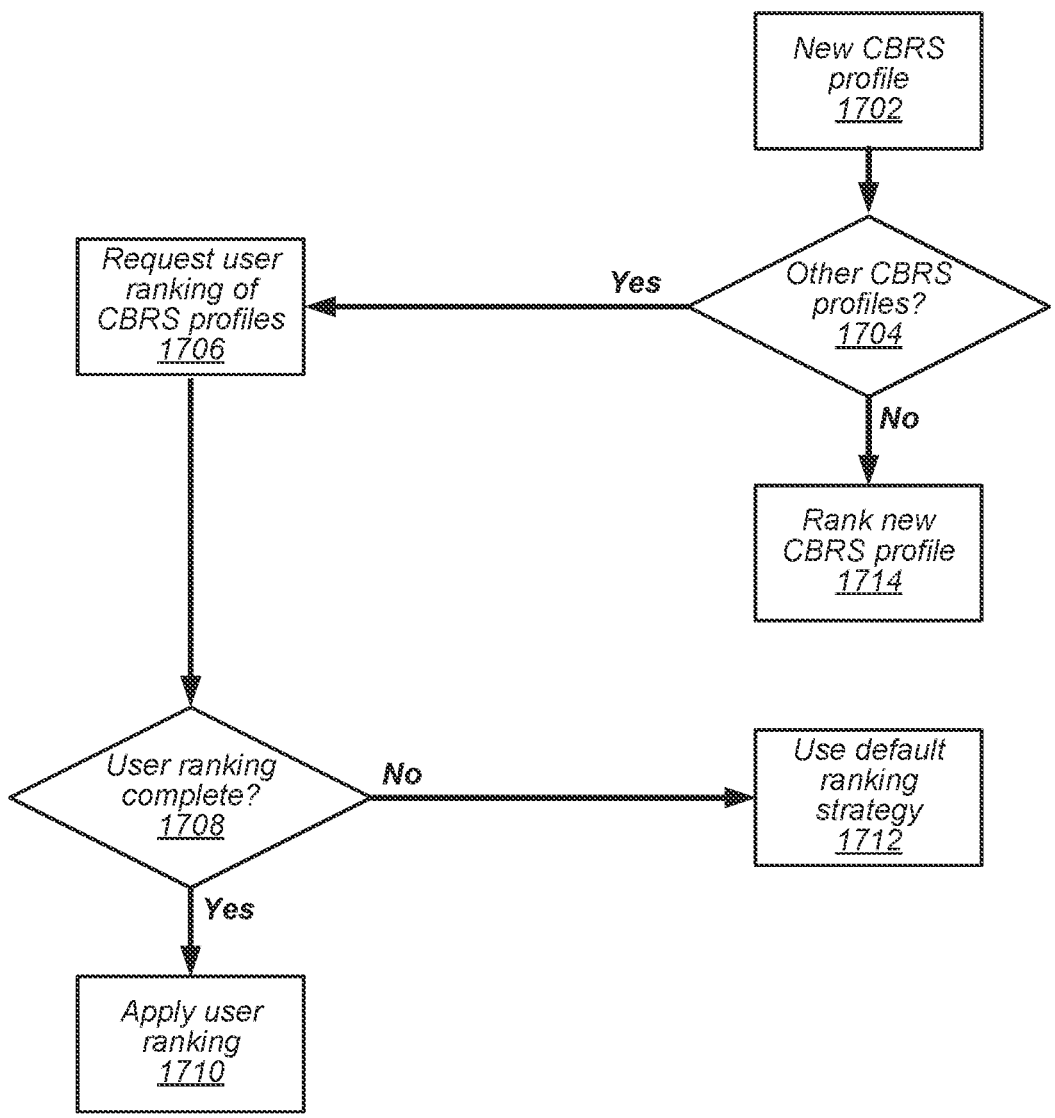
FIG. 17 illustrates an example of a block diagram of a method for ranking CBRS profiles, according to some embodiments.

FIG. 17 illustrates an example of a block diagram of a method for ranking CBRS profiles, according to some embodiments. The method shown in FIG. 17 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1702, a new CBRS profile may be installed on a UE, such as UE 106.

At 1704, the UE may determine whether any other CBRS profiles have been installed.

At 1706, in response to determining that other CBRS profiles have been installed, the UE may request the user to rank the new CBRS profile along with the other CBRS profiles.

At 1708, the UE may determine whether the user ranking is complete. In an instance, the determination as to whether the ranking is complete may be based on one or more factors, such as but not limited to, expiration of a timer, a user input canceling the ranking process, a loss of power to the UE, and so forth.

At 1710, in response to determining that the user ranking is complete, the UE may apply the user ranking to the new CBRS profile along with the other CBRS profiles.

At 1712, in response to determining that the user ranking is not complete, the UE may apply a default ranking to the new CBRS profile along with the other CBRS profiles. For example, default strategies for ranking CBRS profiles when user declines ranking and/or does not complete ranking may include ranking based on time of use with most recently used receiving highest ranking, ranking based on frequency of use with most frequently used receiving highest ranking, ranking based on signal strength with strongest signal receiving highest ranking, and/or using a pop-up notification to user when multiple CBRS have their activation conditions met.

At 1714, in response to determining that no other CBRS profiles have been installed, rank the new CBRS profile with a highest ranking.

Figure 18A:
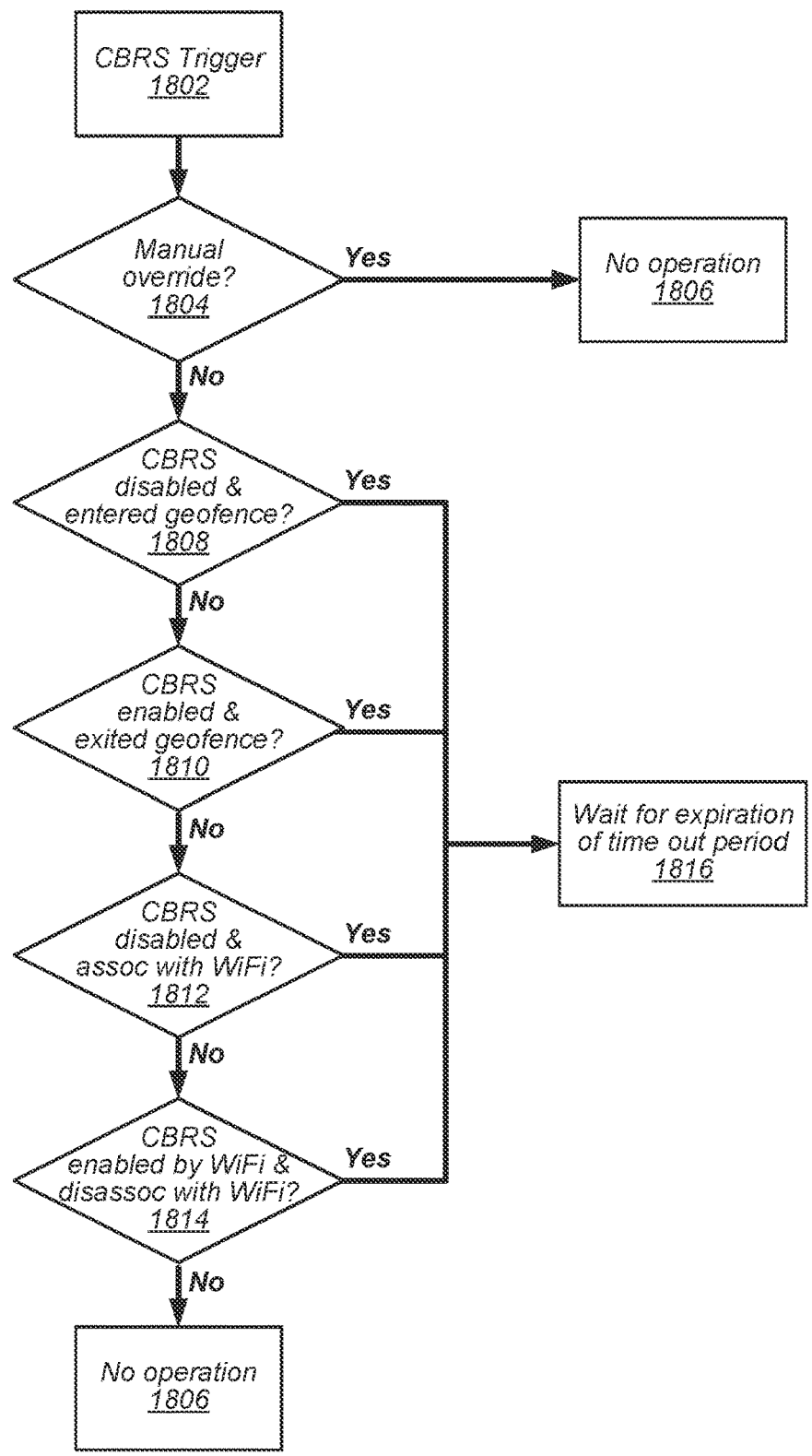
FIGS. 18A and 18B illustrate an example of a block diagram of a method for selection of a CBRS profile from among multiple CBRS profiles, according to some embodiments.
Figure 18B:
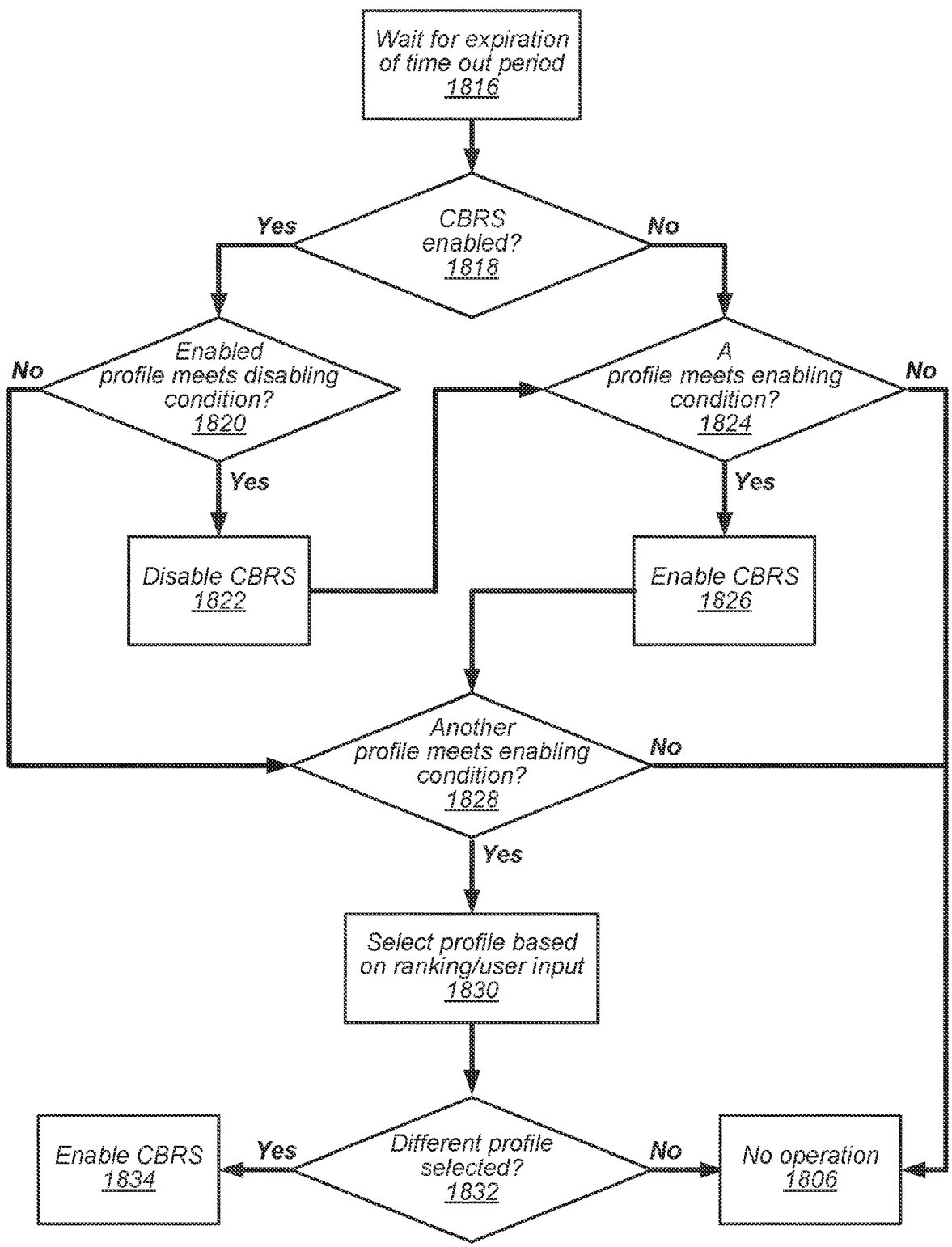

FIGS. 18A and 18B illustrate an example of a block diagram of a method for selection of a CBRS profile from among multiple CBRS profiles, according to some embodiments. The method shown in FIGS. 18A and 18B may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1802, a UE (e.g., a CBRS controller of a UE, such as UE 106) may detect a CBRS trigger condition, e.g., as described above.

At 1804, the UE may determine if any user selection (e.g., manual override) requires the UE to ignore the trigger, e.g., as described above.

At 1806, in response to determining that there is a user selection (e.g., manual override) that requires the UE to ignore the trigger, the UE ignores the trigger.

At 1808, in response to determining that there is not a user selection (e.g., manual override) that requires the UE to ignore the trigger, the UE may determine whether CBRS is disabled and whether the trigger condition is entry into a geofence location.

At 1810, in response to determining at least one of that CBRS is not disabled or that the trigger condition is not entry into a geofence location, the UE may determine whether CBRS is enabled and whether the trigger condition is exiting a geofence location.

At 1812, in response to determining at least one of that CBRS is not enabled or that the trigger condition is not exiting a geofence location, the UE may determine whether CBRS is disabled and whether the trigger condition is association with a WiFi network co-located with the CBRS network.

At 1814, in response to determining at least one of that CBRS is not disabled or that the trigger condition is not association with a WiFi network co-located with the CBRS network, the UE may determine whether CBRS is enabled and whether the trigger condition is disassociation with a WiFi network co-located with the CBRS network.

At 1816, in response to determining at least one of CBRS is disabled and the trigger condition is entry into a geofence location, CBRS is enabled and the trigger condition is exiting a geofence location, CBRS is disabled and the trigger condition is association with a WiFi network co-located with the CBRS network, or CBRS is enabled and the trigger condition is disassociation with a WiFi network co-located with the CBRS network, the UE may wait for expiration of a time out period (e.g., wait for expiration of a hysteresis timer as described above).

Alternatively, in response to determining at least one of that CBRS is not enabled or the trigger condition is not disassociation with a WiFi network co-located with the CBRS network, the UE may ignore the trigger condition at 1806.

Continuing with FIG. 18B, after waiting for the timeout period to expire the UE, at 1818, the UE may determine whether CBRS is enabled.

At 1820, in response to determining that CBRS is enabled, the UE may determine whether an enabled CBRS profile meets a disabling condition.

At 1822, in response to determining that the enabled CBRS profile meets a disabling condition, the UE may disable the CBRS profile.

At 1824, in response to disabling the CBRS profile at 1822 or in response to determining that CBRS is not enabled, the UE may determine whether another CBRS profile meets an enabling condition.

At 1826, in response to determining that another CBRS profile meets an enabling condition, the UE may enable the CBRS profile that meets the enabling condition.

At 1828, in response to enabling the CBRS profile that meets the enabling condition or in response to determining that an enabled CBRS profile does not meet a disabling condition, the UE may determine whether any other CBRS profile meets the enabling condition.

At 1830, in response to determining that at least one additional CBRS profile meets the enabling condition, the UE may use a ranking of the CBRS profiles (e.g., as described above) to select a highest ranked CBRS profile that meets the enabling condition.

At 1832, the UE may determine whether a different CBRS profile is selected as compared to the enabled CBRS profile.

At 1834, in response to determining that a different CBRS profile is selected as compared to the enabled CBRS profile, the UE may activate the selected CBRS profile.

Alternatively, in response to determining that a different CBRS profile is not selected as compared to the enabled CBRS profile, that another CBRS profile does not meet an enabling condition at 1824 or 1828, the UE may take no action at 1806.

In some embodiments, a user may manage CBRS profiles. For example, a user may change a CBRS profile. Then, the UE may determine whether the changed CBRS profile is a disabled CBRS profile. In response to determining that the changed CBRS profile is a disabled CBRS profile, the UE may place the disabled CBRS profile on a deny/ignore list, at least for a period of time. Alternatively, if the changed CBRS profile was not a disabled CBRS profile, the UE may determine whether the CBRS profiles is enabled. In response to determining that the CBRS profile was not enabled, the UE may take no further action. However, in response to determining that the CBRS profile was enabled, the UE may check whether the changed CBRS profile is on the deny/ ignore list. Further, in response to determining that the changed CBRS profile is on the deny/ignore list, the UE may remove the changed CBRS profile from the deny/ignore list and note user selection in CBRS controller. Alternatively, in response to determining that the changed CBRS profile is not on the deny/ignore list, the UE may note user selection in CBRS controller.

In some embodiments, machine learning may be implemented to augment detection of CBRS networks. For example, in some embodiments, reinforcement machine learning may be implemented to augment detection of CBRS networks. For example, an environment may be a model of a city with CBRS deployments and co-located WiFi locations collected from real deployments and an agent may be a device that does not have the ability to detect geofence around CBRS deployments, but does detect WiFi, movement speed, and so forth. The agent may be moved around the city like a real user, camping on/off WiFi networks where available. Then, when the agent correctly performs action (for example, turning on CBRS when inside coverage due to detection of a strong co-located WiFi), the agent may receive a reward and is thus more likely to perform the same action next time. Since the agent does not know the CBRS coverage exactly, the agent may learn to turn on CBRS when co-located WiFi network strength reaches a certain threshold. Further, when the agent incorrectly performs action (for example, turning on CBRS when detecting a weak WiFi network signal), the agent may receive a punishment. Since the agent does not know the CBRS coverage exactly, the agent may learn to not turn on CBRS immediately if the WiFi network signal is weak (which may indicate that the device has not yet entered CBRS geofence). Then, over time, the agent may learn optimal conditions to turn on/off CBRS so that it can be deployed on real devices to do the same in real-world scenarios. As another example, in some embodiments, federated machine learning may be implemented to augment detection of CBRS networks. For example, distributed machine learning on-device may be implemented to protect privacy of users. Thus, each device can obtain WiFi and geofence data independently and train the same machine learning model. Then, a weighted gradient is pooled and returned to centralized server. This is equivalent of training using all the data on the centralized server, but the server does not know each individual training data. The server may then use gradients to update machine learning model and periodically distribute it to each device.

Figure 19:
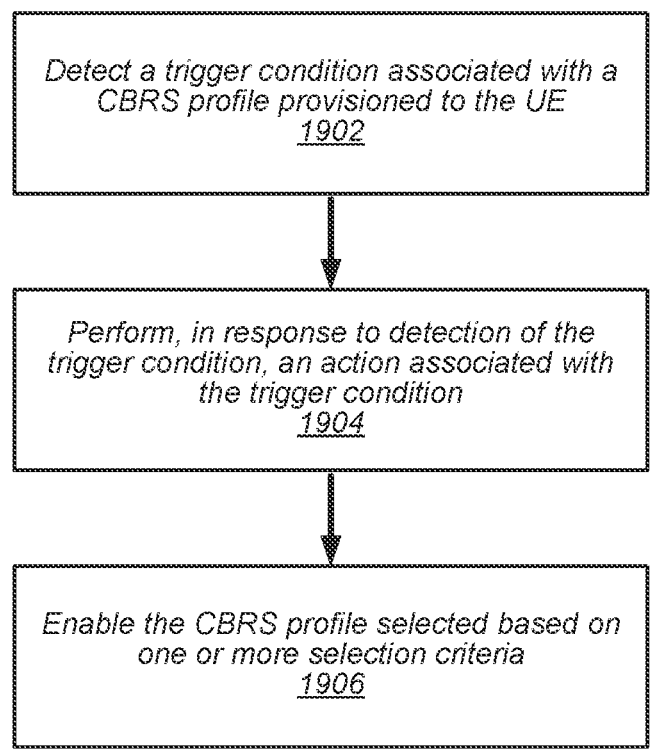
FIG. 19 illustrates a block diagram of an example of a method for selection of a Citizens Broadband Radio Service (CBRS) profile, according to some embodiments.

FIG. 19 illustrates a block diagram of an example of a method for selection of a Citizens Broadband Radio Service (CBRS) profile, according to some embodiments. The method shown in FIG. 19 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1902, a UE, such as UE 106, may detect a trigger condition associated with a CBRS profile. The CBRS profile may be one of one or more CBRS profiles provisioned to the UE. In some instances, the trigger condition may be one of a plurality of trigger conditions. In addition, the plurality of trigger conditions may be prioritized based, at least in part, on trigger type. For example, a first trigger type associated with a user generated trigger condition may be a higher priority trigger condition as compared to a second trigger type associated with a geofence trigger condition. Additionally, the second trigger type may be a higher priority trigger condition as compared to a third trigger type associated with camping on a WiFi or badging into a location.

In some instances, detecting the trigger condition may include the UE determining whether the trigger condition was user generated. In addition, when the UE determines the trigger condition was user generated, the UE may apply the action associated with the trigger condition. Further, when the UE determines the trigger condition was not user generated, the UE may wait a predefined and/or specified period of time (e.g., a hysteresis cycle) prior to performing the action associated with the trigger condition. In such instances, in response to determining, after the predefined and/or specified period of time, that the trigger condition persists, the UE may apply the action associated with the trigger condition. Additionally, in response to determining, after the predefined and/or specified period of time, that the trigger condition does not persist, the UE may not apply the action associated with the trigger condition.

At 1904, the UE may perform, in response to detection of the trigger condition, an action associated with the trigger condition. The action may include at least enablement of the CBRS profile. The CBRS profile may be selected from one or more CBRS profiles. In some instances, the action associated with the trigger condition may include ignoring the trigger condition, CBRS profile disablement, and/or a CBRS profile update.

At 1906, the UE may enable the CBRS profile.

In some instances, the UE may retrieve, from a geofencing data server, CBRS geofence data based, at least in part, on one or more CBRS profiles installed on an eSIM of the UE. In addition, the UE may generate, based on the retrieved CBRS geofence data, the one or more CBRS profiles, thereby provisioning the one or more CBRS profiles to the UE. The CBRS geofence data may be provided to the geofencing data server by an operator portal. The operator portal may receive the CBRS geofence data from a CBRS network transmit/receive point (TRP). The CBRS network TRP may be a base station or an access point. The CBRS geofence data may include information associated with locations of one or more CBRS networks. Additionally, for each CBRS network of the one or more CBRS networks, the information associated with location may include any, any combination of, and/or all of (e.g., one or more of and/or at least one of) coordinates of boundary locations of a CBRS network, a network name, a base station identifier (ID), a base station name, a band, an Absolute Radio Frequency Channel (ARFCN), a Shared Home Network Identifier (SHNI), a Public Land Mobile Network (PLMN) ID, a tracking area code (TAC), a cell ID, a CBRS network ID (NID), a latitude of a TRP, a longitude of a TRP, an altitude of a TRP, a radius of the geofence area, and/or a list of co-located WiFi Service Set Identifiers (SSIDs).

In some instances, the UE may perform a band scan based on the CBRS profile and perform network attachment to a CBRS network associated with the CBRS profile.

In some instances, the UE may determine to prefer cellular communications via the CBRS network over WiFi communications for data transmissions.

In some instances, the UE may monitor, relative to a geofence area associated with the CBRS profile, UE location and upon determining an exit from the geofence area, disable the CBRS profile. In some instances, the UE may switch a data preference from a CBRS network to a co-located mobile network operator network (MNO) network. In some instances, the UE may determine to prefer WiFi communications over cellular communications via the co-located MNO network for data transmissions.

In some instances, detecting the trigger condition may include the UE detecting include any, any combination of, and/or all of (e.g., one or more of and/or at least one of) entry into a geofence area, wherein the geofence area is associated with the CBRS profile, camping on a WiFi network co-located with a CBRS network associated with the CBRS profile, badging into a location associated with a CBRS network associated with the CBRS profile, and/or enablement of a CBRS mode of the UE.

In some instances, the action associated with the trigger condition may depend, at least in part, on a CBRS state. For example, when the action associated with the trigger condition is CBRS profile disablement, the UE may ignore the action when the CBRS state is inactive, when the CBRS state is geofence enabled and the trigger condition is at least one of disconnecting from a WiFi network co-located with a CBRS network associated with the CBRS profile or badging out of a location associated with a CBRS network associated with the CBRS profile, or when the CBRS state is user enabled and the trigger condition is at least one of disconnecting from on a WiFi network co-located with a CBRS network associated with the CBRS profile, badging out of a location associated with a CBRS network associated with the CBRS profile, and/or exit from a geofence area associated with the CBRS profile. As another example, when the action associated with the trigger condition is CBRS profile disablement, the UE may enter a hysteresis cycle when the CBRS state is WiFi enabled or badge enabled and the trigger condition is at least one of exiting from a geofence area associated with the CBRS profile, disconnecting from a WiFi network co-located with a CBRS network associated with the CBRS profile, badging out of a location associated with a CBRS network associated with the CBRS profile, or loss of a CBRS signal, when the CBRS state is geofence enabled and the trigger condition is at least one of exiting from a geofence area associated with the CBRS profile or loss of a CBRS signal, entering a hysteresis cycle, and/or when the CBRS state is user enabled and the trigger condition is loss of a CBRS signal. As a further example, when the action associated with the trigger condition is CBRS profile enablement, the UE may ignore the action when the CBRS state is WiFi enabled or badge enabled and the trigger condition is at least one of camping on a WiFi network co-located with a CBRS network associated with the CBRS profile or badging into a location associated with a CBRS network associated with the CBRS profile, when the CBRS state is geofence enabled or user enabled and the trigger condition is at least one of camping on a WiFi network co-located with a CBRS network associated with the CBRS profile, and/or badging into a location associated with a CBRS network associated with the CBRS profile. In yet another example, when the action associated with the trigger condition is CBRS profile enablement, the UE may enter a hysteresis cycle when the CBRS state is inactive and the trigger condition is at least one of camping on a WiFi network co-located with a CBRS network associated with the CBRS profile, badging into a location associated with a CBRS network associated with the CBRS profile, or the entering geofence area associated with the CBRS profile, and/or when the CBRS state is WiFi enabled or badge enabled and the trigger condition is entering a geofence location associated with the CBRS profile. Note that the hysteresis cycle may include the UE waiting a predefined and/or specified period of time prior to performing the action associated with the trigger condition.

In some instances, performing, in response to detection of the trigger condition, an action associated with the trigger condition may include the UE ignoring the trigger condition in response to determining that a user selection requires the UE to ignore the trigger condition. Further, the UE may wait for expiration of a time out period (e.g., performing a hysteresis cycle) in response to determining at least one of CBRS is disabled and the trigger condition is entry into a geofence location, CBRS is enabled and the trigger condition is exiting a geofence location, CBRS is disabled and the trigger condition is association with a WiFi network co-located with the CBRS network, and/or CBRS is enabled and the trigger condition is disassociation with a WiFi network co-located with the CBRS network. In some instances, the UE may ignore the trigger condition when none of the following conditions are satisfied:

CBRS is disabled and the trigger condition is entry into a geofence location;
CBRS is enabled and the trigger condition is exiting a geofence location;
CBRS is disabled and the trigger condition is association with a WiFi network co-located with the CBRS network; and
CBRS is enabled and the trigger condition is disassociation with a WiFi network co-located with the CBRS network.

In some instances, the UE may, after expiration of the timeout period, enabling CBRS when CBRS is disabled and the trigger condition is entry into a geofence location or when CBRS is disabled and the trigger condition is association with a WiFi network co-located with the CBRS network, disable CBRS when CBRS is enabled and the trigger condition is exiting a geofence location or when CBRS is disabled and the trigger condition is association with a WiFi network co-located with the CBRS network, and ignore the trigger condition when a CBRS signal is detected or when none of the following conditions are satisfied:

CBRS is disabled and the trigger condition is entry into a geofence location;
CBRS is enabled and the trigger condition is exiting a geofence location;
CBRS is disabled and the trigger condition is association with a WiFi network co-located with the CBRS network; and
CBRS is enabled and the trigger condition is disassociation with a WiFi network co-located with the CBRS network.

In some instances, the UE may determine signal quality metrics for one or more networks co-located with a CBRS network associated with the CBRS profile, wherein the one or more networks include one or more mobile network operator (MNO) networks and one or more WiFi networks. Further, the UE may determine, based, at least in part, on the determined signal quality metrics, a preference order for MNO networks and the CBRS network and a preference order for the CBRS network, MNO networks, and WiFi networks. In some instances, determining, based, at least in part, on the determined signal quality metrics, a preference order for MNO networks and the CBRS network and a preference order for the CBRS network, MNO networks, and WiFi networks may include the UE determining the preference order for MNO networks and the CBRS network and the preference order for the CBRS network, MNO networks, and WiFi networks based further on one or more application metrics or network policies. Note that application metrics may include one or more quality of service requirements or current internet session connections. Note further that the network policies may include one or more of CBRS network preferences or carrier preferences.

In some instances, the UE may install a new CBRS profile and determine whether any other CBRS profiles have been previously installed. Further, in response to determining that other CBRS profiles have been installed, the UE may request, via a user interface, a user to rank the new CBRS profile along with the other CBRS profiles. Additionally, the UE may determine whether the user ranking is complete and in response to determining that the user ranking is not complete, apply a default ranking to the new CBRS profile along with the other CBRS profiles. The default ranking may include any, any combination of, and/or all of (e.g., at least one of and/or one or more of) ranking based on time of use with a most recently used CBRS profile receiving a highest ranking, ranking based on frequency of use with a most frequently used CBRS profile receiving a highest ranking, ranking based on signal strength with a strongest signal CBRS profile receiving highest ranking, and/or using a pop-up notification to query a user to select a CBRS profile when multiple CBRS profiles have activation conditions met.

In some instances, performing, in response to detection of the trigger condition, an action associated with the trigger condition may include the UE ignoring the trigger condition in response to determining that a user selection requires the UE to ignore the trigger condition. In addition, the UE may wait for expiration of a time out period (e.g., a hysteresis cycle) in response to determining that the CBRS is disabled and the trigger condition is entry into a geofence location, determining that the CBRS is enabled and the trigger condition is exiting a geofence location, determining that the CBRS is disabled and the trigger condition is association with a WiFi network co-located with the CBRS network, and/or determining that the CBRS is enabled and the trigger condition is disassociation with a WiFi network co-located with the CBRS network. The UE may, after expiration of timeout period and in response to determining that the CBRS is not enabled and a CBRS profile meets an enabling condition or that an enabled CBRS does not meet a disabling condition, determine whether another CBRS profile meets an enabling condition. Further, in response to determining the another CBRS profile meets the enabling condition, the UE may select a CBRS profile based on user input or a ranking of CBRS profiles. In some instances, the UE may ignore the trigger condition when none of the following conditions are satisfied:

CBRS is disabled and the trigger condition is entry into a geofence location;
CBRS is enabled and the trigger condition is exiting a geofence location;
CBRS is disabled and the trigger condition is association with a WiFi network co-located with the CBRS network; and
CBRS is enabled and the trigger condition is disassociation with a WiFi network co-located with the CBRS network.

In some instances, the UE may determine that a CBRS profile has changed or expired and determine whether a carrier supports geofence data. In addition, the UE may retrieve or fetch, in response to determining that the carrier supports geofence data, the geofence data from the carrier. In some instances, determining whether the carrier supports geofence data may include the UE querying an entitlements server of the carrier. In some instances, the UE may retrieve or fetch, in response to determining that the carrier does not support geofence data, the geofence data from a server hosted by a manufacturer of the UE.

In some instances, the UE may receive a command to update a CBRS profile and determine whether a carrier supports geofence data. Further, the UE may retrieve or fetch, in response to determining that the carrier supports geofence data, the geofence data from the carrier. In some instances, determining whether the carrier supports geofence data may include the UE querying an entitlements server of the carrier. In some instances, the UE may retrieve or fetch, in response to determining that the carrier does not support geofence data, the geofence data from a server hosted by a manufacturer of the UE.

In some instances, the UE may detect entry into a geofence location of a known CBRS region and attempt to verify the CBRS region. The UE may transmit, to a server, a confirmation of verification in response to verifying the CBRS region. In some instances, attempting to verify the CBRS region may be in response to the UE receiving a request to verify the CBRS region. In some instances, the UE may transmit, to the server, updated CBRS information in response to not verifying the CBRS region.

In some instances, the UE may receive, based on a current location of the UE, a request to scan for a CBRS region and determine, in response to the request, whether a new CBRS region has been located. Further, in response to determining the new CBRS region has been located, the UE may send updated CBRS information to a server. The request may be received from a mobile network operator (MNO) or carrier.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment device (UE), comprising:
   at least one antenna;
   at least one radio, wherein the at least one radio is configured to perform cellular communication using at least one radio access technology (RAT);
   at least one processor coupled to the at least one radio, wherein the one or more processors and the at least one radio are configured to perform communications;
   wherein the one or more processors are configured to cause the UE to:
      detect a trigger condition associated with a Citizens Broadband Radio Service (CBRS) profile of one or more CBRS profiles provisioned to the UE, wherein the trigger condition is one of a plurality of trigger conditions prioritized based, at least in part, on a trigger type;
      perform, in response to detection of the trigger condition, an action associated with the trigger condition, wherein the action includes at least enablement of a CBRS profile selected from the one or more CBRS profiles; and
      enable the CBRS profile.

2. The UE of claim 1,
   wherein a first trigger type associated with a user generated trigger condition is a higher priority trigger condition as compared to a second trigger type associated with a geofence trigger condition, and wherein the second trigger type is a higher priority trigger condition as compared to a third trigger type associated with camping on a WiFi or badging into a location.

3. The UE of claim 1,
   wherein, to detect the trigger condition, the at least one processor is further configured to cause the UE to:
      determine whether the trigger condition was user generated;
      apply the action associated with the trigger condition based on determining the trigger condition was user generated; and
      wait a predefined or specified period of time prior to performing the action associated with the trigger condition based on determining the trigger condition was not user generated.

4. The UE of claim 3,
   wherein the at least one processor is further configured to cause the UE to:
      in response to determining, after the predefined or specified period of time, that the trigger condition persists, apply the action associated with the trigger condition; and
      in response to determining, after the predefined or specified period of time, that the trigger condition does not persist, ignore the action associated with the trigger condition.

5. An apparatus, comprising:
   a memory; and
   at least one processor in communication with the memory and configured to:
      detect a trigger condition associated with a Citizens Broadband Radio Service (CBRS) profile of one or more CBRS profiles that have been stored in the memory, wherein the trigger condition is one of a plurality of trigger conditions prioritized based, at least in part, on a trigger type;
      perform, in response to detection of the trigger condition, an action associated with the trigger condition, wherein the action includes at least enablement of a CBRS profile selected from the one or more CBRS profiles; and
      enable the CBRS profile.

6. The apparatus of claim 5,
   wherein the action associated with the trigger condition further comprises at least one of:
      ignoring the trigger condition;
      CBRS profile disablement; or
      CBRS profile update.

7. The apparatus of claim 5,
   wherein the action associated with the trigger condition depends, at least in part, on a CBRS state.

8. The apparatus of claim 7,
   wherein, when the action associated with the trigger condition is a CBRS profile disablement, the at least one processor is further configured to:
      ignore the action when the CBRS state is inactive, when the CBRS state is geofence enabled and the trigger condition is at least one of disconnecting from a WiFi network co-located with a CBRS network associated with the CBRS profile or badging out of a location associated with a CBRS network associated with the CBRS profile, or when the CBRS state is user enabled and the trigger condition is at least one of disconnecting from on a WiFi network co-located with a CBRS network associated with the CBRS profile, badging out of a location associated with a CBRS network associated with the CBRS profile, or exit from a geofence area associated with the CBRS profile; and
      enter a hysteresis cycle when the CBRS state is WiFi enabled or badge enabled and the trigger condition is at least one of exiting from a geofence area associated with the CBRS profile, disconnecting from a WiFi network co-located with a CBRS network associated with the CBRS profile, badging out of a location associated with a CBRS network associated with the CBRS profile, or loss of a CBRS signal, when the CBRS state is geofence enabled and the trigger condition is at least one of exiting from a geofence area associated with the CBRS profile or loss of a CBRS signal, entering a hysteresis cycle, or when the CBRS state is user enabled and the trigger condition is loss of a CBRS signal, wherein the hysteresis cycle includes waiting a predefined and/or specified period of time prior to performing the action associated with the trigger condition.

9. The apparatus of claim 7,
   wherein, when the action associated with the trigger condition is a CBRS profile enablement, the at least one processor is further to:
      ignore the action when the CBRS state is WiFi enabled or badge enabled and the trigger condition is at least one of camping on a WiFi network co-located with a CBRS network associated with the CBRS profile or badging into a location associated with a CBRS network associated with the CBRS profile, when the CBRS state is geofence enabled or user enabled and the trigger condition is at least one of camping on a WiFi network co-located with a CBRS network associated with the CBRS profile or badging into a location associated with a CBRS network associated with the CBRS profile; and enter a hysteresis cycle when the CBRS state is inactive and the trigger condition is at least one of camping on a WiFi network co-located with a CBRS network associated with the CBRS profile, badging into a location associated with a CBRS network associated with the CBRS profile, or entering geofence area associated with the CBRS profile or when the CBRS state is WiFi enabled or badge enabled and the trigger condition is entering a geofence location associated with the CBRS profile, wherein the hysteresis cycle includes waiting a predefined and/or specified period of time prior to performing the action associated with the trigger condition.

10. A method for selection of a Citizens Broadband Radio Service (CBRS) profile, comprising:
detecting, by a user equipment device (UE), a trigger condition associated with a CBRS profile of one or more CBRS profiles provisioned to the UE, wherein the trigger condition is one of a plurality of trigger conditions prioritized based, at least in part, on a trigger type;
performing, by the UE and in response to detection of the trigger condition, an action associated with the trigger condition, wherein the action includes at least enablement of a CBRS profile selected from the one or more CBRS profiles; and
enabling, by the UE, the CBRS profile.

11. The method of claim 10,
wherein a first trigger type associated with a user generated trigger condition is a higher priority trigger condition as compared to a second trigger type associated with a geofence trigger condition, and wherein the second trigger type is a higher priority trigger condition as compared to a third trigger type associated with camping on a WiFi or badging into a location.

12. The method of claim 10,
wherein detecting the trigger condition comprises:
determining, by the UE, whether the trigger condition was user generated;
applying, by the UE, the action associated with the trigger condition based on determining the trigger condition was user generated; and
waiting, by the UE, a predefined or specified period of time prior to performing the action associated with the trigger condition based on determining the trigger condition was not user generated.

13. The method of claim 12, further comprising:
in response to determining, after the predefined or specified period of time, that the trigger condition persists, applying, by the UE, the action associated with the trigger condition; and
in response to determining, after the predefined or specified period of time, that the trigger condition does not persist, ignoring, by the UE, the action associated with the trigger condition.

14. The method of claim 10,
wherein the action associated with the trigger condition further comprises at least one of:
ignoring the trigger condition;
CBRS profile disablement; or
CBRS profile update.

15. The method of claim 10,
wherein the action associated with the trigger condition depends, at least in part, on a CBRS state.

16. The method of claim 15,
wherein, when the action associated with the trigger condition is a CBRS profile disablement, the method further comprises:
ignoring, by the UE, the action when the CBRS state is inactive, when the CBRS state is geofence enabled and the trigger condition is at least one of disconnecting from a WiFi network co-located with a CBRS network associated with the CBRS profile or badging out of a location associated with a CBRS network associated with the CBRS profile, or when the CBRS state is user enabled and the trigger condition is at least one of disconnecting from on a WiFi network co-located with a CBRS network associated with the CBRS profile, badging out of a location associated with a CBRS network associated with the CBRS profile, or exit from a geofence area associated with the CBRS profile; and
entering, by the UE, a hysteresis cycle when the CBRS state is WiFi enabled or badge enabled and the trigger condition is at least one of exiting from a geofence area associated with the CBRS profile, disconnecting from a WiFi network co-located with a CBRS network associated with the CBRS profile, badging out of a location associated with a CBRS network associated with the CBRS profile, or loss of a CBRS signal, when the CBRS state is geofence enabled and the trigger condition is at least one of exiting from a geofence area associated with the CBRS profile or loss of a CBRS signal, entering a hysteresis cycle, or when the CBRS state is user enabled and the trigger condition is loss of a CBRS signal, wherein the hysteresis cycle includes waiting a predefined and/or specified period of time prior to performing the action associated with the trigger condition.

17. The method of claim 15,
wherein, when the action associated with the trigger condition is a CBRS profile enablement, the method further comprises:
ignoring, by the UE, the action when the CBRS state is WiFi enabled or badge enabled and the trigger condition is at least one of camping on a WiFi network co-located with a CBRS network associated with the CBRS profile or badging into a location associated with a CBRS network associated with the CBRS profile, when the CBRS state is geofence enabled or user enabled and the trigger condition is at least one of camping on a WiFi network co-located with a CBRS network associated with the CBRS profile or badging into a location associated with a CBRS network associated with the CBRS profile; and
entering, by the UE, a hysteresis cycle when the CBRS state is inactive and the trigger condition is at least one of camping on a WiFi network co-located with a CBRS network associated with the CBRS profile, badging into a location associated with a CBRS network associated with the CBRS profile, or entering geofence area associated with the CBRS profile or when the CBRS state is WiFi enabled or badge enabled and the trigger condition is entering a geofence location associated with the CBRS profile, wherein the hysteresis cycle includes waiting a predefined and/or specified period of time prior to performing the action associated with the trigger condition.

18. The UE of claim 1,
wherein the action associated with the trigger condition further comprises at least one of:
ignoring the trigger condition;
CBRS profile disablement; or
CBRS profile update.

19. The UE of claim 1,
wherein the action associated with the trigger condition depends, at least in part, on a CBRS state.

20. The apparatus of claim 5,
wherein a first trigger type associated with a user generated trigger condition is a higher priority trigger condition as compared to a second trigger type associated with a geofence trigger condition, and wherein the second trigger type is a higher priority trigger condition as compared to a third trigger type associated with camping on a WiFi or badging into a location.

* * * * *